(12) United States Patent
Nakamura et al.

(10) Patent No.: US 7,265,930 B2
(45) Date of Patent: *Sep. 4, 2007

(54) MEDIUM AND APPARATUS FOR MAGNETIC RECORDING AND METHOD FOR MEASURING THE OFFSET AMOUNT

(75) Inventors: Hiroaki Nakamura, Kanagawa (JP); Minoru Yonezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/483,743

(22) Filed: Jul. 11, 2006

(65) Prior Publication Data

US 2006/0250718 A1    Nov. 9, 2006

Related U.S. Application Data

(62) Division of application No. 10/994,395, filed on Nov. 23, 2004.

(30) Foreign Application Priority Data

Nov. 28, 2003    (JP) .............................. 2003-400873

(51) Int. Cl.
G11B 21/02    (2006.01)
G11B 5/596    (2006.01)
(52) U.S. Cl. ..................................... 360/75; 360/77.08
(58) Field of Classification Search .................... None
See application file for complete search history.

(56) References Cited

U.S. PATENT DOCUMENTS 3,258,750 A    6/1966    Shew
4,935,278 A    6/1990    Krounbi et al.
5,892,634 A    4/1999    Ito et al.
5,978,168 A    11/1999   Mathews et al.
5,986,847 A    11/1999   Le et al.
6,320,718 B1   11/2001   Bouwkamp et al.

FOREIGN PATENT DOCUMENTS

| JP | 6-139734 | 5/1994 |
|---|---|---|
| JP | 8-293110 | 11/1996 |
| JP | 9-45025 | 2/1997 |
| JP | 2000-100098 | 4/2000 |
| JP | 2000-322848 | 11/2000 |
| JP | 2001-216616 | 8/2001 |
| JP | 2001-243611 | 9/2001 |

Primary Examiner—K. Wong
(74) Attorney, Agent, or Firm—Oblon, Spivak, McClelland, Maier & Neustadt, P.C.

(57) ABSTRACT

A magnetic recording medium includes a discrete area and an offset amount measurement area. The discrete area has a plurality of magnetic tracks where data can be recorded and that has a non-magnetic track where the data cannot be recorded located between the plurality of adjacent magnetic tracks. In the offset amount measurement area, measurement data for measuring an offset amount indicating a relative distance from a center position of the magnetic track to the first head in a direction crossing the magnetic track when the second head is on the center position of the magnetic track can be recorded.

4 Claims, 26 Drawing Sheets

THE OFFSET AMOUNT

FIG.11

| HEAD NUMBER | TRACK NUMBER | MEMORY NUMBER | THE OFFSET AMOUNT |
|---|---|---|---|
| 0 | 0 | 1 | A 1 |
|   | 1 0 | 2 | A 2 |
|   | 2 0 | 3 | A 3 |
|   | ... | ... | ... |
|   | N * 1 0 | N | A n |
| 1 | 0 | N + 1 | A n + 1 |
|   | 1 0 | N + 2 | A n + 2 |
|   | 2 0 | N + 3 | A n + 3 |
|   | ... | ... | ... |
|   | N * 1 0 | 2 N | A 2 n |
| ... | ... | ... | ... |

FIG.25

| SECTOR NUMBER | OFFSET NUMBER |
|---|---|
| 1 | A1 |
| 2 | A2 |
| 3 | A3 |
| 4 | A4 |
| 5 | A5 |
| 6 | A6 |
| 7 | A7 |
| ... | ... |

THE OFFSET AMOUNT

MEDIUM AND APPARATUS FOR MAGNETIC RECORDING AND METHOD FOR MEASURING THE OFFSET AMOUNT

CROSS-REFERENCE TO RELATED APPLICATIONS

This application is a divisional of U.S. application Ser. No. 10/994,395 filed on Nov. 23, 2004, and is based upon and claims the benefit of priority from the prior Japanese Patent Application No. 2003-400873, filed Nov. 28, 2003, the entire contents of each of which are incorporated herein by reference.

BACKGROUND OF THE INVENTION

1) Field of the Invention

The present invention relates to a technology for performing magnetic recording in a medium.

2) Description of the Related Art

Recently, as a storage capacity of a computer is increased, the storage capacity of a magnetic recording apparatus such as a hard disk drive (HDD) tends to increase. To increase the storage capacity of the magnetic recording apparatus, it is necessary to perform the recording in higher density by making a finer column of recording magnetic domains in a magnetic recording layer, which is formed by a signal magnetic field generated from a magnetic head. A perpendicular magnetic recording method is generally known as the method for recording the finer column of recording magnetic domains.

In the perpendicular magnetic recording method, the recording is performed by magnetizing the recording layer of a magnetic recording medium in a direction perpendicular to a plane of the recording layer. However, in the case of the extremely high recording density more than 100 Gbit/in$^2$, recording action into adjacent tracks occurs by side fringing generated from a side face of the magnetic head, which results in recording failure and reproduction failure.

Therefore, the so-called discrete track type of magnetic recording medium has been proposed. In the discrete track type of magnetic recording medium, non-magnetic tracks made of a non-magnetic material are formed in a circumferential direction of the recording layer of the magnetic recording medium, and data is recorded only in magnetic tracks made of the magnetic material. In the discrete track type of magnetic recording medium, since the non-magnetic track is provided between tracks, there is an advantage that the data is prevented from recording in the adjacent tracks to realize good recording/reproduction characteristics.

In the conventional magnetic recording apparatus, generally a thin film inductive head is used as a recording head that records the data in the magnetic recording medium. An MR (magneto-resistance effect) head is used as a reproducing head that reproduces the data from the magnetic recording medium. Each head is mounted on the same slider to form a composite head. In a rotary type of drive structure, the composite head is supported at a tip of a head actuator, and the composite head is controlled so as to be moved in a radial direction crossing the magnetic track of the magnetic recording medium to be positioned at the desired sector. A servo area is provided in a recording surface of the magnetic recording medium. In the servo area, positional information such as a track position and a sector position is recorded in a track direction at predetermined intervals.

FIG. 26 is a schematic diagram that depicts the structure of the recording surface and the composite head of HDD that is of the discrete track type of magnetic recording medium having a servo area 103. In this case, the magnetic recording medium is the discrete track type having the non-magnetic track between the magnetic tracks, and each sector 104 includes a discrete area 101 and the servo area 103. The discrete area 101 includes the magnetic track 202 in which the data can be recorded and the non-magnetic track 201 in which the data can not be recorded. The magnetic track 202 is formed by the magnetic material. The non-magnetic track 201 is provided between the magnetic tracks 202. A magnetic head 210 has the structure in which a recording head 211 and a reproducing head 212 are separately arranged. Therefore, a recording center position of the recording head during recording the data and a reproducing center position of the reproducing head during reproducing the data is usually different from each other. When a signal is reproduced, the reproducing head is positioned at the track center position with respect to a predetermined target track. However, when the signal is recorded, the recording head is positioned while shifted from the track center position.

On the other hand, when the recording head is positioned at the track center position, the reproducing head is positioned while shifted from the track center position. The amount of shift has a different value in each track, because an angle of the magnetic head is changed depending on the target track.

Accordingly, to be able to respond to the target track, it is necessary to previously measure the offset amount that is of the amount of shift between the center position during the recording and the center position during the reproduction and to perform offset amount control which corrects the center position during the recording and the center position during the reproduction using the measured amount.

To measure the offset amount, the reproducing head is positioned at the track center to record a measurement pattern indicating the recording head position. Then, the data is reproduced while the reproducing head is gradually moved, and the optimum offset amount is determined by deciding the offset amount in which amplitude of the reproduction signal becomes maximum or the center position of an offset range in which the amplitude of the reproduction signal becomes maximum (For example, see Japanese Patent Laid-Open No. 9-45025).

SUMMARY OF THE INVENTION

It is an object of the present invention to at least solve the problems in the conventional technology.

A magnetic recording medium according to one aspect of the present invention includes a discrete area that has a plurality of magnetic tracks where data can be recorded and that has a non-magnetic track where the data can not be recorded located between the plurality of adjacent magnetic tracks; and an offset amount measurement area where measurement data for measuring an offset amount indicating a relative distance from a center position of the magnetic track to the first head in a direction crossing the magnetic track when the second head is on the center position of the magnetic track can be recorded.

A magnetic recording apparatus according to another aspect of the present invention is one that performs magnetic recording of data to a discrete track type of magnetic recording medium including a discrete area that has a plurality of magnetic tracks where data can be recorded and that has a non-magnetic track where the data can not be recorded located between the plurality of adjacent magnetic tracks, and an offset amount measurement area where data can be recorded, the magnetic recording apparatus includes a recording head that records the measurement data in the offset amount measurement area; a reproducing head that reproduces the measurement data recorded in the offset amount measurement area; a storage unit that stores the measurement data reproduced by the reproduction unit; and a determining unit that performs a plurality of reproducing movements of the reproducing head in a plurality of different positions of the reproducing head, and determines the offset amount based on a plurality of measurement data reproduced by the reproducing head and a plurality of measurement data stored in the storage unit.

A method for measuring the offset amount according to still another aspect of the present invention is one that measures the offset amount for a discrete track type of magnetic recording medium including a discrete area that has a plurality of magnetic tracks where data can be recorded and that has a non-magnetic track where the data can not be recorded located between the plurality of adjacent magnetic tracks; and an offset amount measurement area where data can be recorded, the method for measuring the offset amount includes recording the measurement data with the recording head while the reproducing head is positioned at a predetermined track in the offset amount measurement area; reproducing the measurement data with the reproducing head while the reproducing head and the recording head are moved in a direction crossing the magnetic track and storing the reproduced measurement data in a storage unit; and performing a plurality of reproducing movements of the reproducing head in a plurality of different positions of the reproducing head and determining the offset amount based on a plurality of measurement data reproduced by the reproducing head and a plurality of measurement data stored in the storage unit.

The other objects, features, and advantages of the present invention are specifically set forth in or will become apparent from the following detailed description of the invention when reproduced in conjunction with the accompanying drawings.

BRIEF DESCRIPTION OF THE DRAWINGS

FIG. 11 is an explanatory view shown by a table of an example of the optimum offset amount in each track stored in the offset storage circuit;

FIG. 25 is an explanatory view that depicts an example of the table in which the offset amount is determined in each sector number.

DETAILED DESCRIPTION

Exemplary embodiments relating to the present invention will be explained in detail below with reference to the accompanying drawings.

The embodiment is one in which the magnetic recording medium and the magnetic recording apparatus of the invention are applied to the hard disk (HD) and the hard disk drive (HDD).

A structure of the hard disk of the first embodiment will be first described.

While the hard disk can be formed in any shape, the hard disk of the first embodiment is formed as a disk. The hard disk has a structure in which an offset amount measurement area is provided in a radial direction between the discrete area and the servo area. In the offset amount measurement area, the offset amount that is of a relative distance between the reproducing head and the recording head in a recording medium radial direction is measured.

Figure 1:
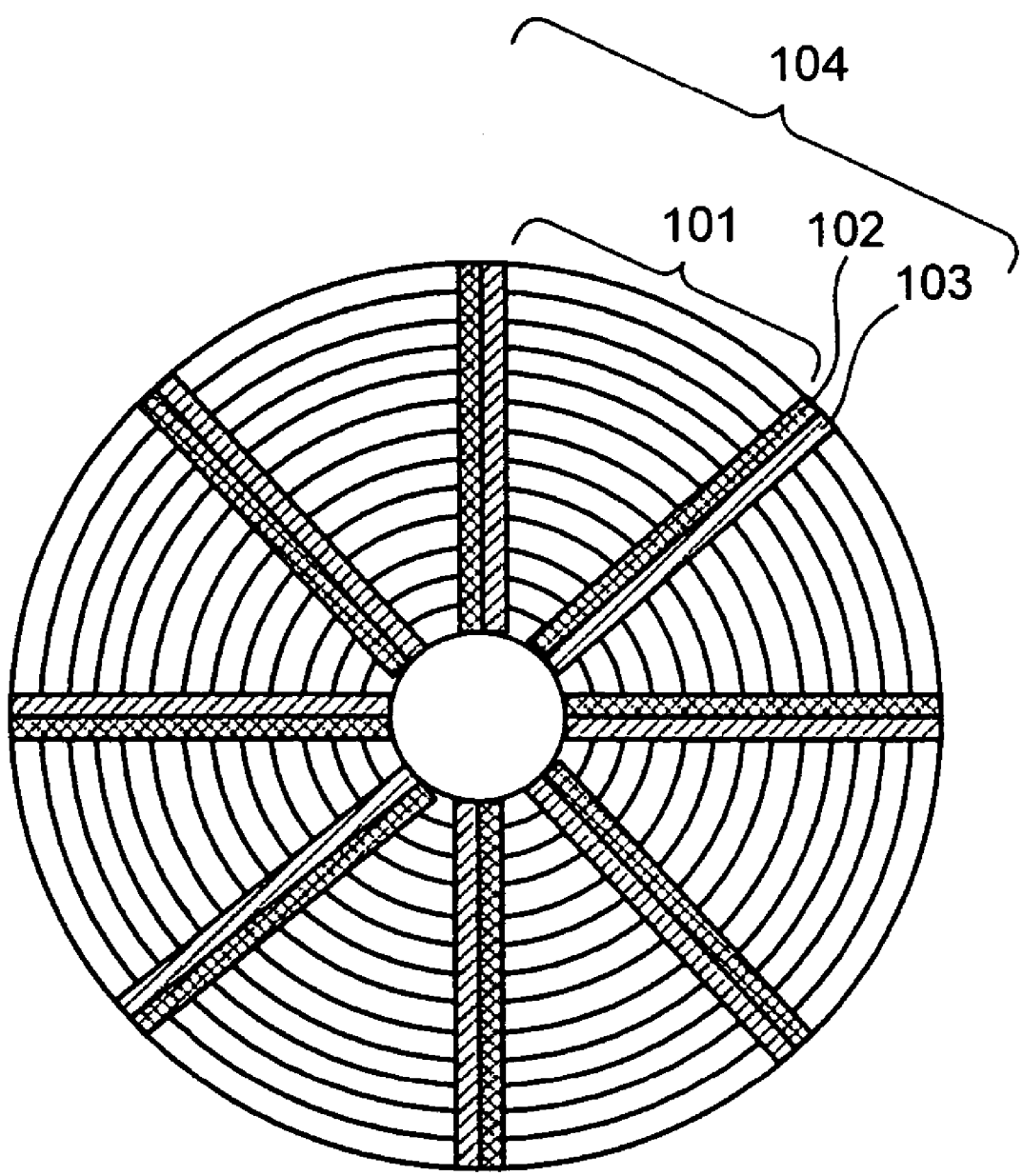
FIG. 1 is a schematic diagram that depicts a structure of a hard disk according to a first embodiment of the invention.

FIG. 1 is a schematic diagram that depicts the structure of the hard disk according to the first embodiment. The hard disk of the first embodiment is the discrete track type of hard disk that a composite magnetic head having a first head (in this embodiment, a recording head of HDD) and a second head (in this embodiment, a reproducing head of HDD) can record data on and reproduce data from. The hard disk has a plurality of sectors 104. Each sector 104 has a discrete area 101, an offset amount measurement area 102, and a servo area 103. The discrete area 101 has a plurality of magnetic tracks where data can be recorded and that has a non-magnetic track where the data cannot be recorded located between the plurality of adjacent magnetic tracks. The offset amount measurement area 102 is one in which measurement data for measuring an offset amount indicating a relative distance from a center position of the magnetic track to the first head in a direction crossing the magnetic track (in a radius direction where the hard disk is formed as a disk) when the second head is on the center position of the magnetic track can be recorded. The servo area 103 has a track number and a sector number that are of positional information on the sector 104, and servo data is stored in the servo area 103. The discrete area 101 is provided along the circumferential direction of the hard disk, and the servo area 103 and the offset amount measurement area 102 are provided along a radius direction.

Figure 2:
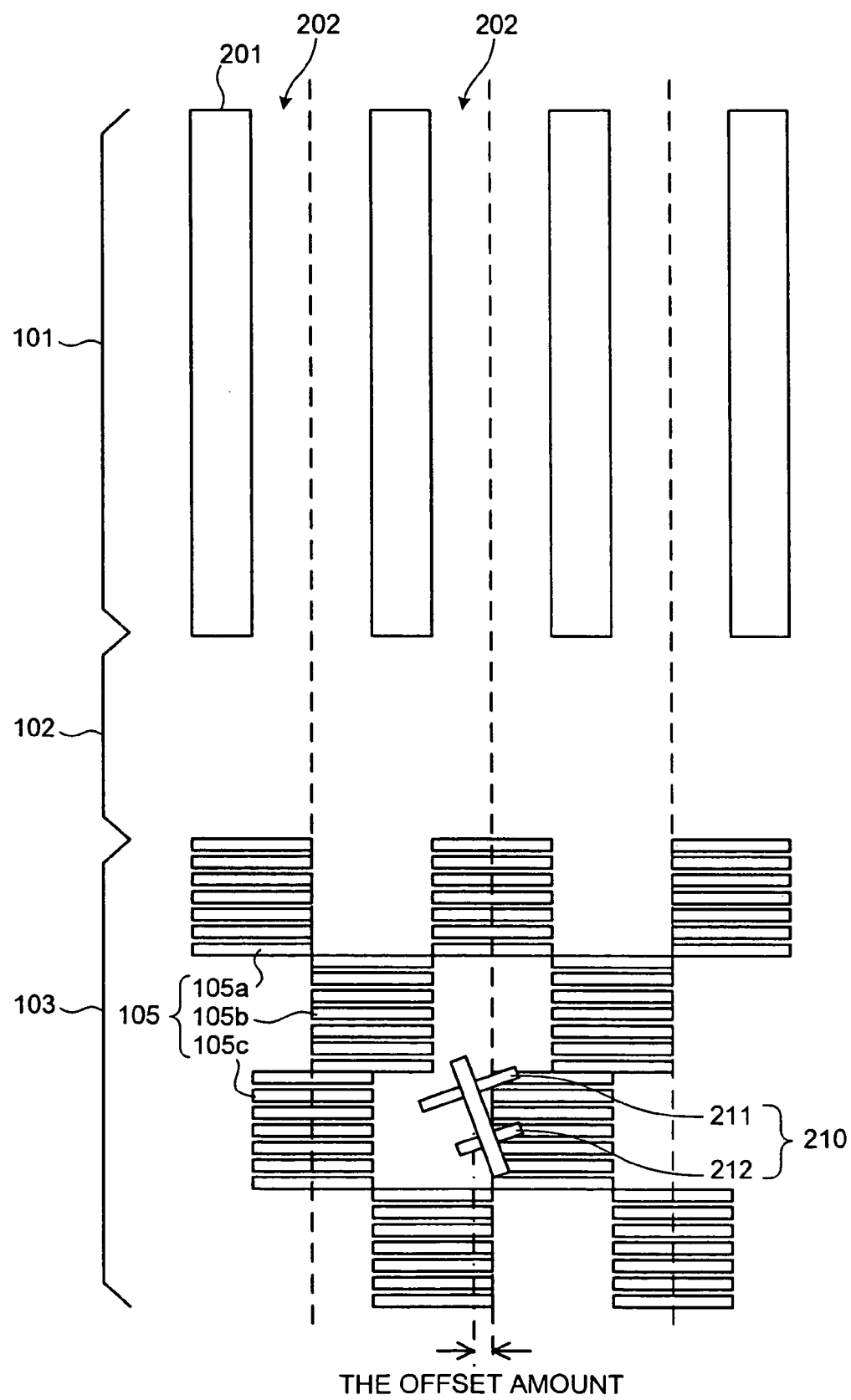
FIG. 2 is a schematic diagram that depicts detail structures of a discrete area, an offset amount measurement area, and a servo area in the hard disk of the first embodiment.

FIG. 2 is a schematic diagram that depicts the detail structures of the discrete area 101, the offset amount measurement area 102, and the servo area 103 in the hard disk of the first embodiment. As shown in FIG. 2, the discrete area 101 includes the magnetic track 202 made of magnetic material in which the data can be recorded and the non-magnetic track 201 in which the data can not be recorded. The non-magnetic track 201 is provided between the magnetic tracks 202. The offset amount measurement area 102 is formed only by the magnetic material in which the data can be recorded, and there is no non-magnetic track in the offset amount measurement area 102. The servo area 103 is also formed only by the magnetic material in which the data can be recorded. The servo area 103 has burst signal areas 105. Each burst signal area 105 is corresponding to each magnetic track 202 and has a plurality of signal recording areas 105a to 105c. Each of signal recording areas 105 to 105c is one in which a plurality of signal recording areas 103a to in which burst signals for positioning the composite magnetic head are recorded. Broken lines of FIG. 2 indicate a center position of the magnetic track 202 (the first center position, and hereinafter, a center track position of discrete area) and a center position among the signal recording areas 105a to 105c of the servo area (the second center position, and hereinafter, a center position of the servo area).

Since the offset amount measurement area 102 is provided between the servo area 103 and the discrete area 101, when the process of measuring the offset amount is performed after positioning the magnetic head, the amount of movement of the magnetic head can be minimized and the process of measuring the offset amount can be rapidly performed.

FIG. 2 also shows a state in which the magnetic head 210 is positioned at the servo area 103. The composite head is used in the first embodiment. In the composite head, the recording head 211 and the reproducing head 212 are separately provided as the magnetic head 210. FIG. 2 shows the state in which the reproducing head 212 is positioned at a track center position. As shown in FIG. 1, each cylinder of the hard disk is formed in a disk shape and a locus of which the magnetic head is moved is an arc, so that the relative distance (the offset amount) between the reproducing head 212 and the recording head 211 in the radial direction of the hard disk is changed in each track. In the embodiment, the offset amount that is of the relative distance is measured in each track.

Figure 3:
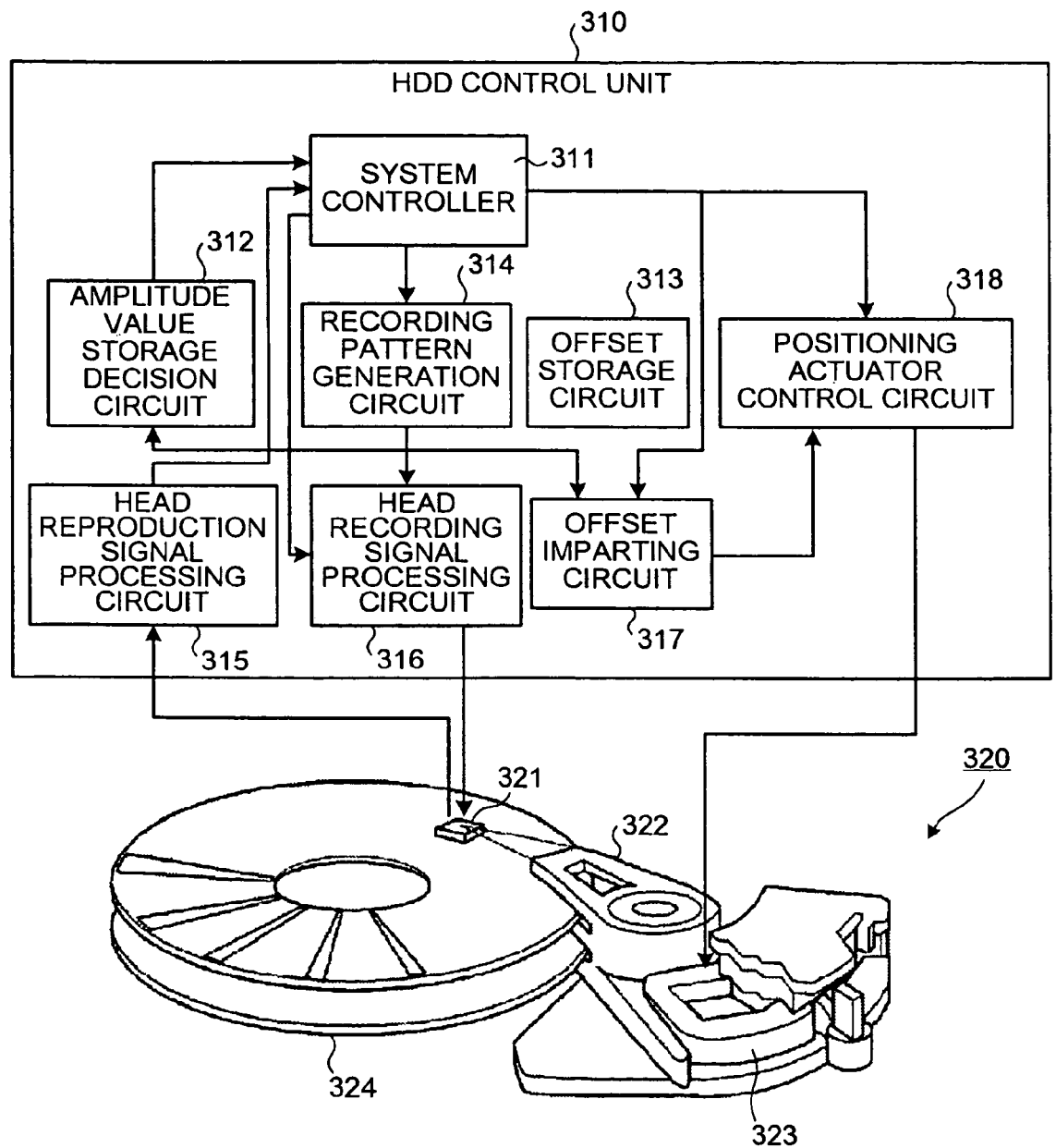
FIG. 3 is a block diagram that depicts the configuration of a hard disk drive of the first embodiment.

A configuration of the hard disk drive (HDD) of the first embodiment is explained below. FIG. 3 is a block diagram that depicts the configuration of the hard disk drive of the embodiment. The hard disk drive (HDD) of the embodiment includes a drive mechanism unit 320 having a hard disk (HD) 324, a magnetic head 321, and a suspension arm 322 and a HDD controller 310 provided as a control circuit on a printed board in the hard disk drive.

As shown in FIG. 3, the HDD controller 310 includes a system controller 311, an amplitude storage decision circuit 312, an offset storage circuit 313, a recording pattern generation circuit 314, a positioning actuator control circuit 318, a head reproduction signal processing circuit 315, a head recording signal processing circuit 316, and an offset imparting circuit 317. The head recording signal processing circuit 316 constitutes recording, the head reproduction signal processing circuit 315 constitutes reproducing unit, and the offset imparting circuit 317 and the positioning actuator control circuit 318 constitute positioning unit.

The amplitude storage decision circuit 312 constitutes a storing unit and a deciding unit. The amplitude storage decision circuit 312 stores an amplitude value of a reproduction signal reproduced from the reproducing head 212 and decides the maximum amplitude value. The offset storage circuit 313 stores the maximum amplitude value in each track as the optimum offset amount.

The recording pattern generation circuit 314 generates a recording pattern of the data recorded in the hard disk. The positioning actuator control circuit 318 positions the reproducing head 212 and the recording head 211. When the data is recorded in the magnetic track 202 by the recording head 211, the positioning actuator control circuit 318 receives the optimum offset amount from the offset imparting circuit 317 and move the magnetic head 210 by the optimum offset amount toward the radial direction of the hard disk. The head reproduction signal processing circuit 315 receives the reproduction signal from the reproducing head 212 and pass the reproduction signal to the system controller 311. The head recording signal processing circuit 316 records the recording pattern signal generated by the recording pattern generation circuit 314 in the hard disk with the recording head 211. The offset imparting circuit 317 passes the optimum offset amount retained in the offset storage circuit 313 to the positioning actuator control circuit 318.

The system controller 311 controls the amplitude storage decision circuit 312, the offset storage circuit 313, the recording pattern generation circuit 314, the positioning actuator control circuit 318, the head reproduction signal processing circuit 315, the head recording signal processing circuit 316, and the offset imparting circuit 317.

Figure 4:
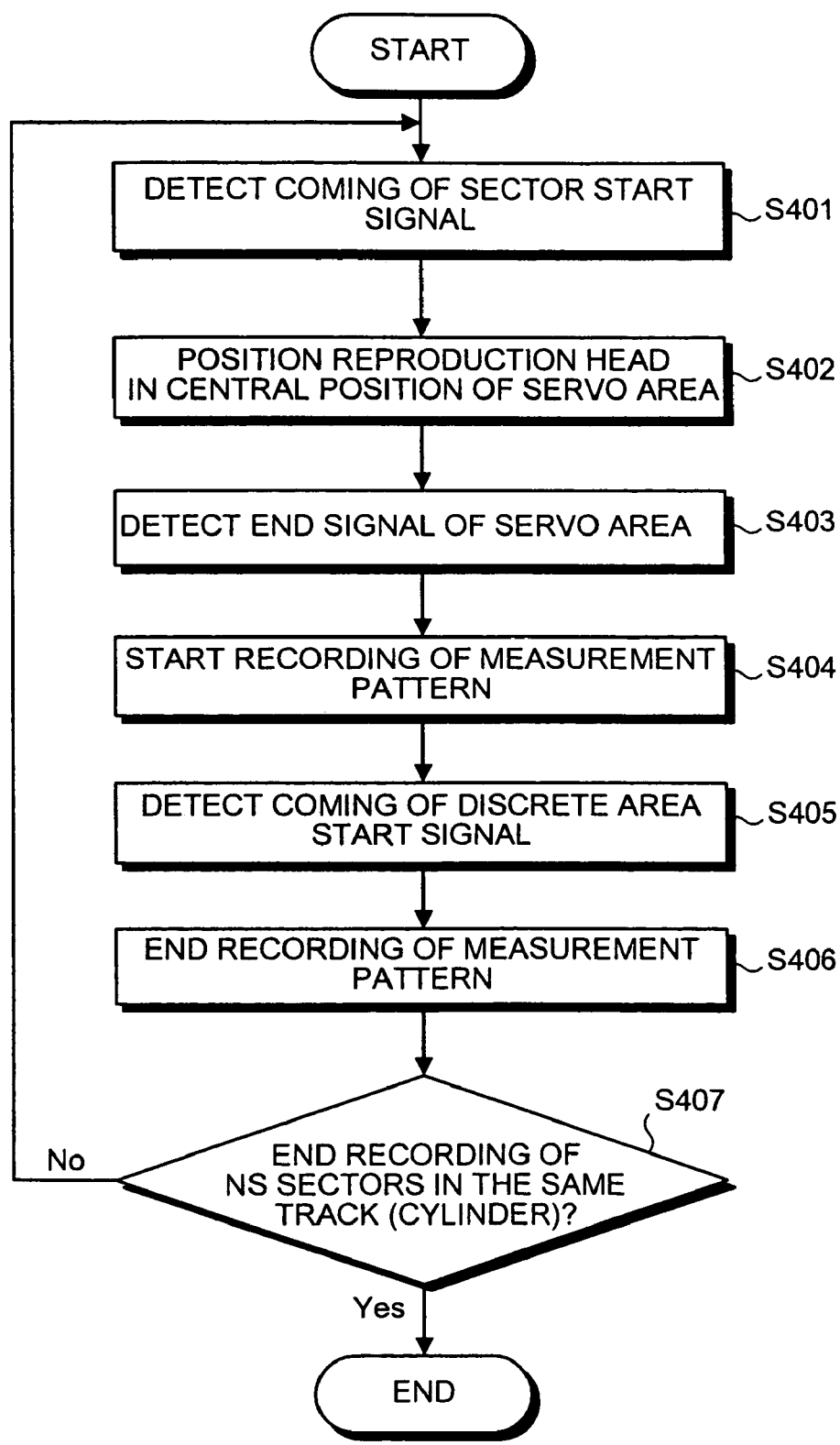
FIG. 4 is a flow chart that depicts a procedure of a process of recording a measurement pattern.

Then, the process of measuring the offset amount by the hard disk drive of the first embodiment having the above-described configuration is explained. In the hard disk drive of the embodiment, the process of measuring the offset amount is performed in two stages of the process of recording a measurement pattern and the process of measuring the offset from the recorded measurement pattern. FIG. 4 is a flow chart that depicts a procedure of the process of recording the measurement pattern.

The offset measuring process and adjusting process of the first embodiment are started while initialization is performed and the magnetic information on the data is not recorded in the offset amount measurement area 102 where the non-magnetic track does not exist. In this state, the suspension arm 322 for supporting the magnetic head 210 on which the reproducing head 212 and the recording head 211 are mounted moves the magnetic head 210 to the innermost radius in the disk. At this point, when an axis of the magnetic head 210 is equal to the axis of the suspension arm 322, a positional relationship of the reproducing head 212 and the recording head 211 with respect to the discrete area becomes as follows. That is, when the center of the reproducing head 212 is positioned with respect to the center of the track, the center position of the recording head 211 is shifted from the center of the track.

The system controller 311 output an offset adjustment start command. The positioning actuator control circuit 318 receives the offset adjustment start command and then move the suspension arm 322 to the innermost radius in the disk. In this state, the head reproduction signal processing circuit 315 waits for receiving a sector area start signal (Step S401).

When the head reproduction signal processing circuit 315 receives the sector area start signal, the system controller 311 displaces a positioning actuator 323 based on the reproduction signal from the servo area 103 to position the reproducing head 212 at the center position of the servo area 103 (Step S402).

Figure 5:
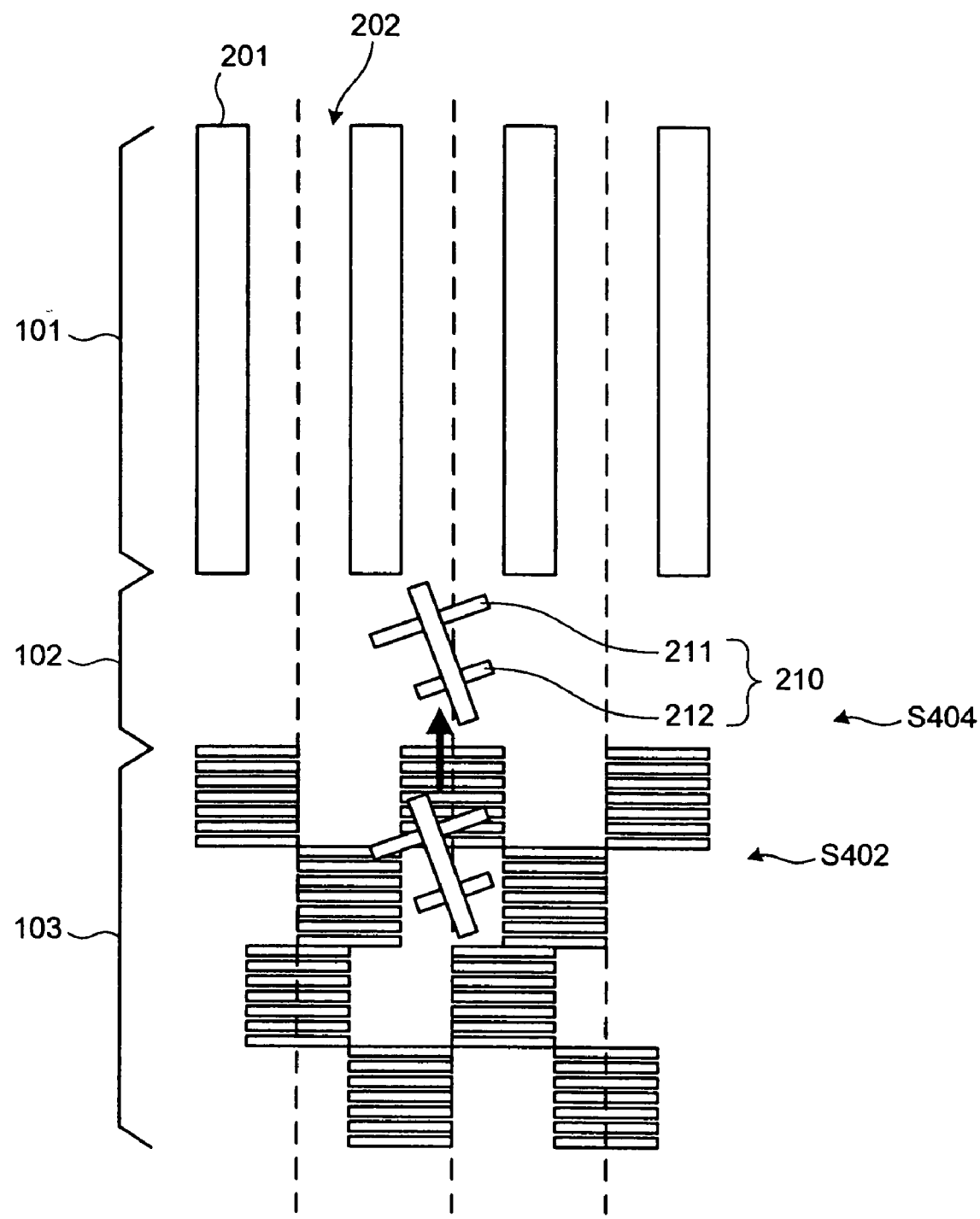
FIG. 5 is an explanatory view that depicts a position of a magnetic head in Step S402 and Step S404 of FIG. 4.

When the system controller 311 detects an end of a servo signal from the head reproduction signal processing circuit 315 (Step S403), the system controller 311 performs the recording action of the measurement pattern with the recording head 211 to the subsequently coming offset amount measurement area 102 (Step S404). FIG. 5 is an explanatory view that depicts the position of the magnetic head 210 in Step S402 and Step S404.

The measurement pattern recorded in Step S404 is a bit pattern changed at a predetermined frequency. In accordance with the modulation method, it is preferable that the measurement pattern is longer than the shortest period T in which the data exists and shorter than the longest period of the data. For example, it is preferable that the measurement pattern is the pattern having periods of 2 T to 4 T. The pattern having periods of 2 T to 4 T is relatively often generated in a modulation circuit of the hard disk drive. The reason why the pattern having periods of 2 T to 4 T is adopted is that the processing in a filter circuit adjusts to the data having periods of 2 T to 4 T.

When the system controller 311 receives a trigger signal indicating the coming of the discrete area 101 (Step S405), the system controller 311 stops the recording of the measurement pattern (Step S406). The trigger signal is generated from count clocks based on a disk radial position so as to be input slightly before the coming of the discrete area 101 to prevent misrecording in the magnetic track 202 of the discrete area 101. Then, similarly to the recording start sector, while the reproducing head 212 performs tracking to the same track, the system controller 311 records the measurement pattern having periods of 2 T to 4 T for the Ns sectors (down-track direction) that is continuous with the recording start sector. When the system controller 311 ends the recording of the measurement data for the Ns sectors on the same offset adjustment condition (Step S407), the recording process for the offset adjustment is ended to transfer to the process of measuring the offset amount.

In the process of recording the measurement pattern, it is preferable that the number of sectors Ns is set to Ns=n×m so that the measurements of n sectors can be performed for m types of the amounts of offset. The number of sectors Ns is one in which the recording of the same pattern is repeated while the reproducing head 212 performs tracking to the same track.

Figure 6:
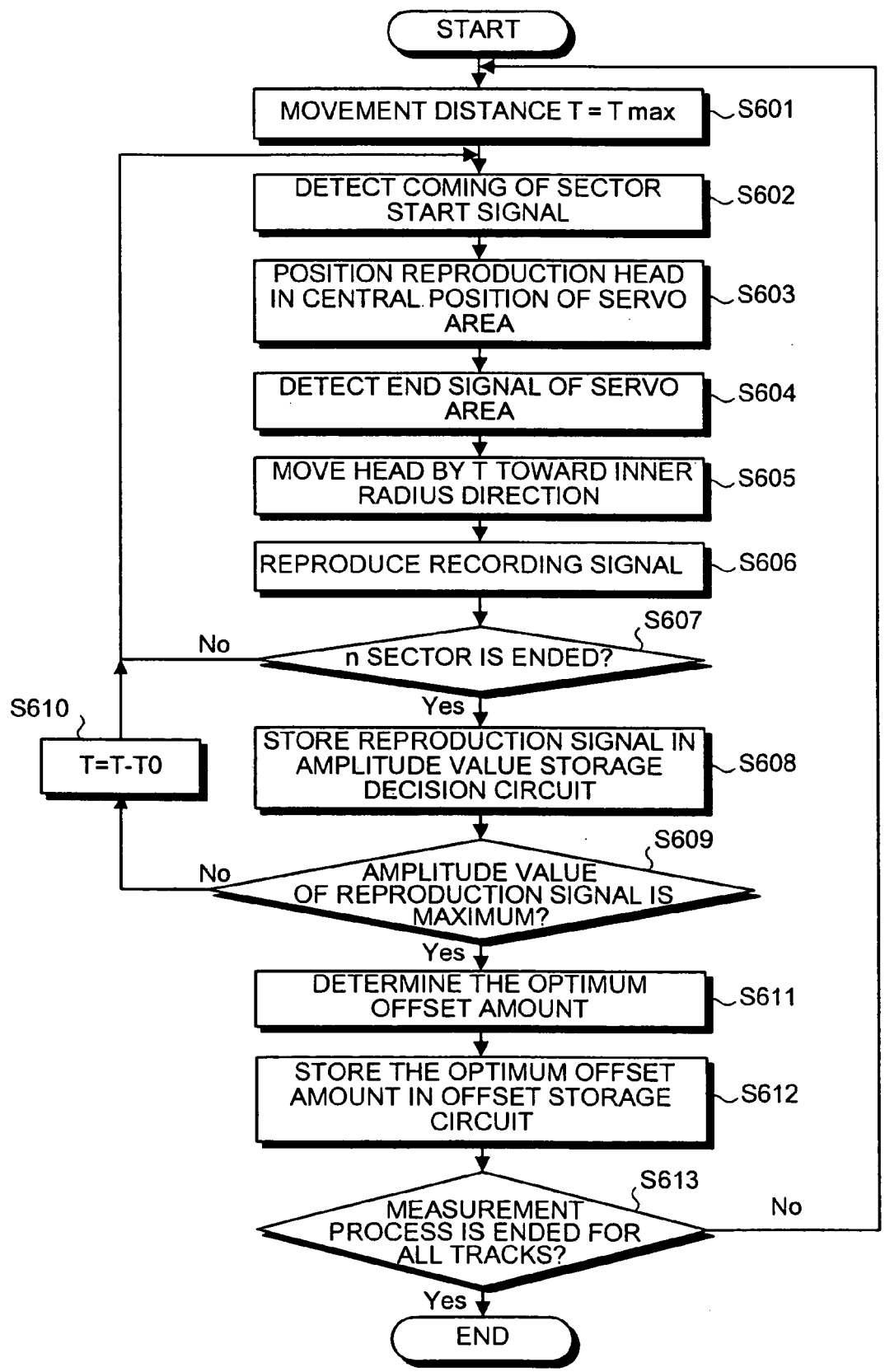
FIG. 6 is a flow chart that depicts the procedure of a process of measuring the offset amount.

FIG. 6 is a flow chart that depicts the procedure of the process of measuring the offset amount. The measuring process is started from the recording start sector. T indicating a movement distance of the magnetic head 210 toward the radial direction is initialized by Tmax (Step S601). When the system controller 311 receives the coming of the recording start sector (Step S602), the reproducing head 212 is positioned at the center position of the discrete area 101 shown by the servo area 103 (Step S603).

Figure 7:
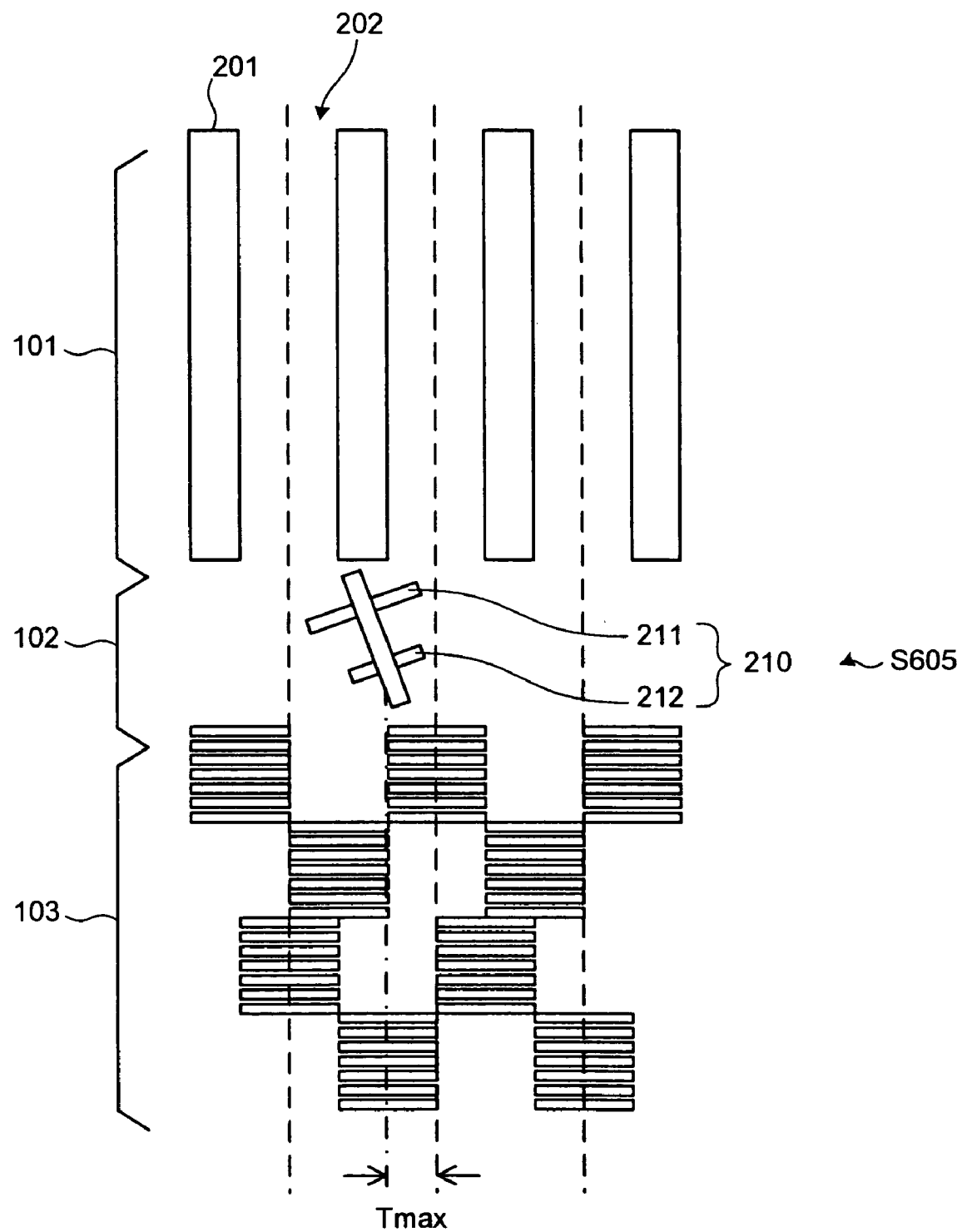
FIG. 7 is an explanatory view that depicts a state in which the magnetic head is moved by a distance Tmax toward an inner radius direction from a track center position shown by a reproducing head.

In passage of the magnetic head 210 through the servo area 103 of the recording start sector, when a flag signal for indicating the passage of the magnetic head 210 through the servo area 103 is detected (Step S604), the magnetic head 210 is moved by the distance T (Tmax in the first time) toward an inner radius direction from the track center position shown by the reproducing head 212 (Step S605). FIG. 7 is an explanatory view that depicts the state in which the magnetic head 210 is moved by the distance Tmax toward the inner radius direction from the track center position shown by the reproducing head 212.

Figure 8:
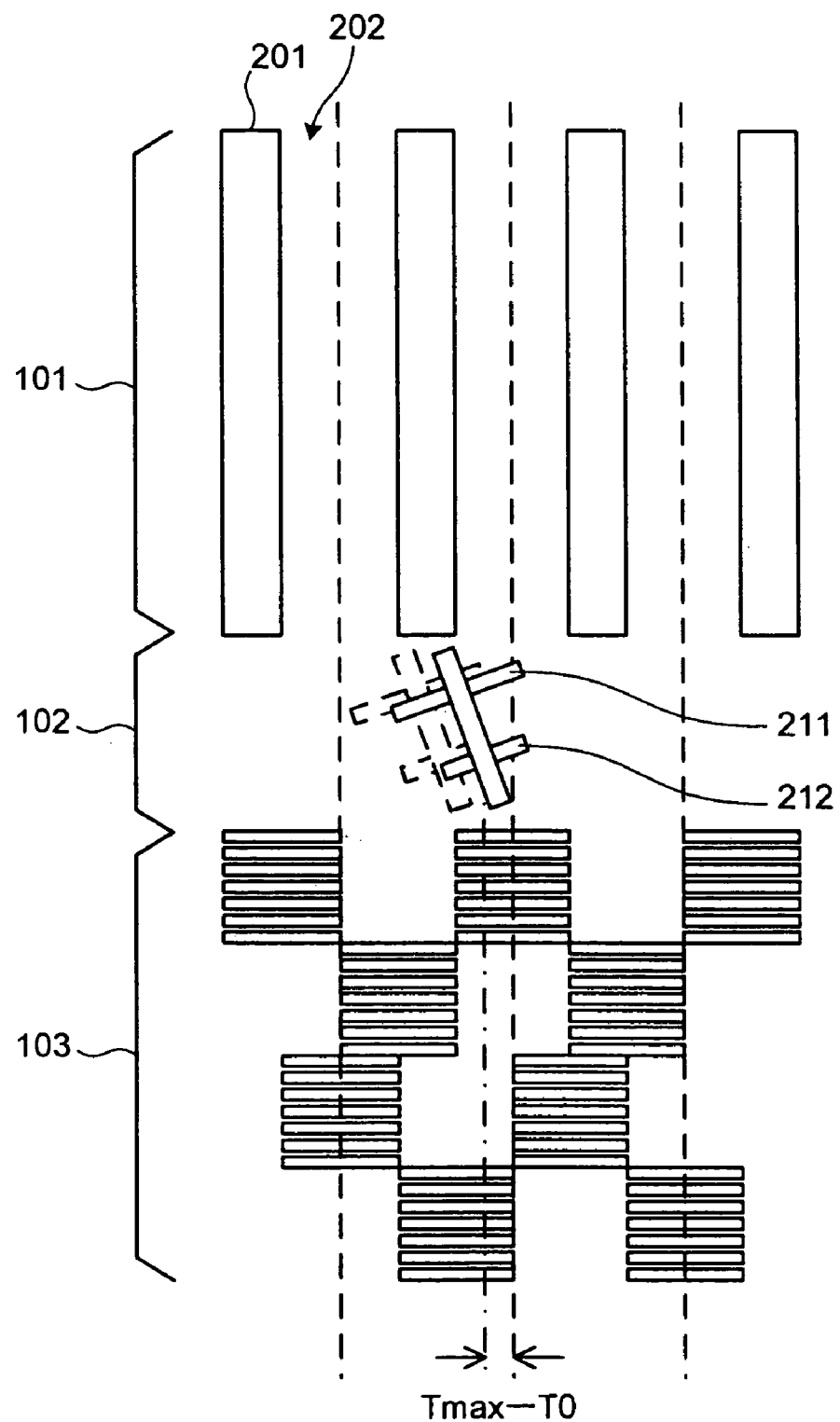
FIG. 8 is an explanatory view that depicts a state in which the magnetic head is moved by T0 toward an outer radius direction from a position where the magnetic head is moved by the distance Tmax toward the inner radius direction from the track center position.

It is also possible that the movement direction is an outer radius direction of the recording medium. The reproducing head 212 reproduces the measurement pattern recorded in the offset amount measurement area 102 (Step S606). The measurement value is an amplitude value of the reproduction signal having a fixed frequency pattern, which is recorded in the offset amount measurement area 102 having no non-magnetic track through the recording process. As in the case of the recording action, the measurement of the amplitude value of the reproduction signal is ended by receiving the trigger signal generated at timing slightly earlier than the coming of the discrete area 101. The measurement processes from Step S602 to Step S606 are repeatedly performed to given n sectors (Step S607), and the offset amount is stored in the amplitude storage decision circuit 312 as the amplitude data when the offset amount is set to Ts toward the inner radius side (Step S608). Comparing the previous offset amount stored in the amplitude storage decision circuit 312 and the current offset amount, the amplitude storage decision circuit 312 decides whether the amplitude value of the current offset amount becomes the maximum (Step S609). When the amplitude value of the current offset amount does not become the maximum, T is set to T−T0 (Step S610), and the processes from Step S602 to Step S608 are repeated. Therefore, the magnetic head 210 is changed from the state in which the magnetic head 210 is moved by the distance T toward the inner radius side of the disk to the state in which the magnetic head 210 is moved by the distance T0 toward the outer radius side of the disk, and the process of measuring the offset from Step S602 to Step S608 is performed. FIG. 8 is an explanatory view that depicts the state in which the magnetic head 210 is moved by the distance T0 toward the outer radius direction from the position where the magnetic head 210 is moved by the distance Tmax toward the inner radius direction from the track center position.

Figure 9:
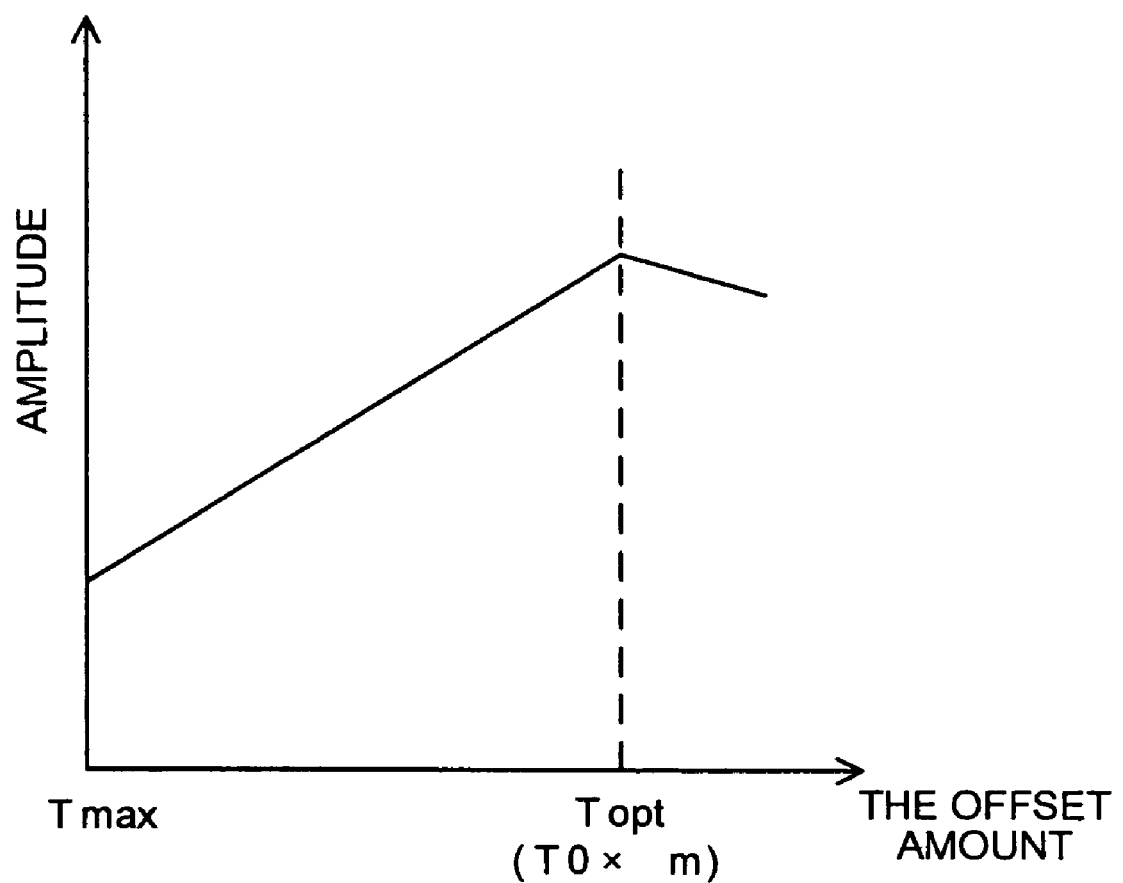
FIG. 9 is an explanatory view shown by graphing a relationship between the offset amount and an amplitude value.

As shown in FIG. 9, the data of the amplitude value for the offset amount obtained by the above-described manner can be shown as the graph of the offset amount and the amplitude value. When the offset amount is changed from the state in which the magnetic head 210 is set to Tmax toward the inner radius side to the state in which the magnetic head 210 is gradually moved toward the outer radius side, as shown in FIG. 9, the measurement can be ended, when the offset amount whose measured amplitude value has the maximum to obtain an inflection point the offset amount is obtained, or when the amplitude value becomes a predetermined value. The amplitude storage decision circuit 312 detects the offset amount, in which the amplitude value becomes initially the maximum, as the optimum offset amount Topt based on the stored data.

The position where the measurement pattern is recorded is the position, where the magnetic head 210 is gradually moved by each distance T0 toward the outer radius of the disk to reproduce the measurement pattern and the amplitude value of the current offset amount is detected as the maximum.

When the amplitude storage decision circuit 312 decides that the amplitude value of the current offset amount becomes the maximum in Step S609, the current offset amount is determined as the optimum offset amount Topt in the track on processing (Step S611), and the current offset amount is stored in offset storage circuit 313 (Step S612). When the optimum offset amount for the track is detected, the measurement pattern recorded in the offset amount measurement area 102 having no non-magnetic track is erased through the same recording sequence. The erasing process can be effective to remove degradation or interference of the data signal recorded in the discrete area 101, which is caused by the influence of the measurement pattern recorded in the offset amount measurement area 102 having no non-magnetic track.

Figure 10:
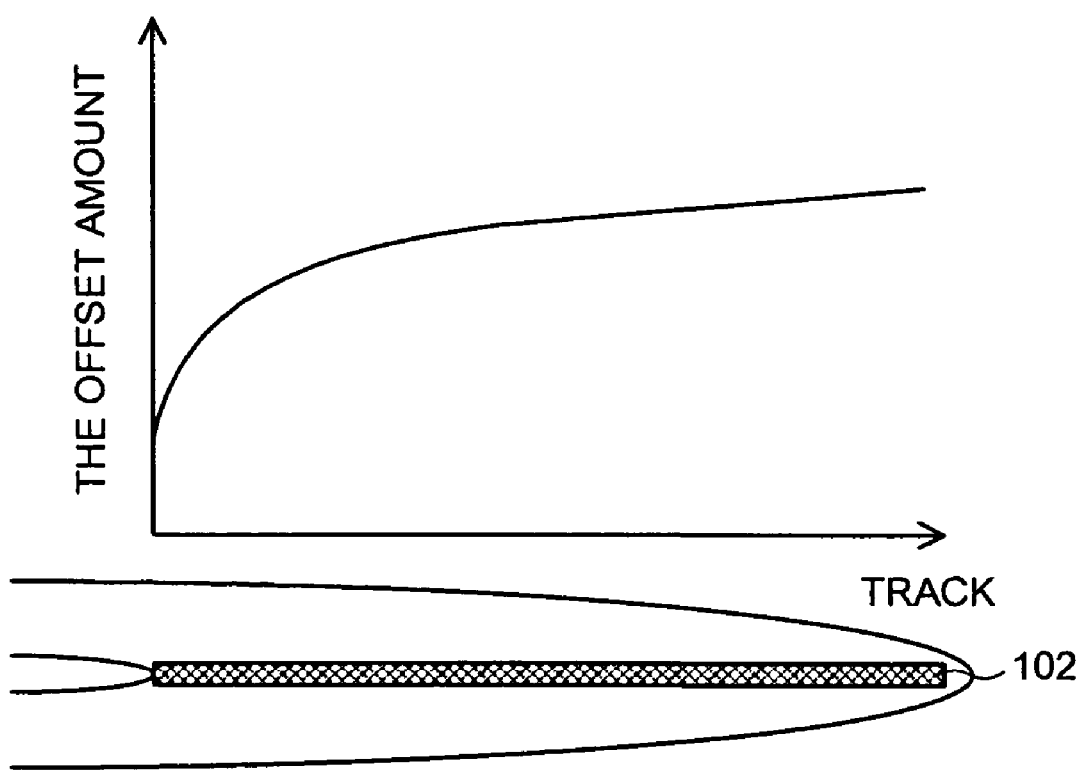
FIG. 10 is an explanatory view graphing an example of the optimum offset amount in each track stored in an offset storage circuit.

Thus, the optimum offset amount is determined in one track, and the measurement processes from Step S601 to Step S612 are performed to all the tracks (Step S613). This allows the optimum offset amount in all the tracks to be measured. FIG. 10 is an explanatory view graphing an example of the optimum offset amount in each track stored in the offset storage circuit 313, and FIG. 11 is an explanatory view shown by a table of an example of the optimum offset amount in each track stored in the offset storage circuit 313. In the example shown in FIG. 11, the amounts of offset measured in each ten tracks are stored in the memory. Although the measurement is performed in each ten tracks in the example, the interval can arbitrarily be set in accordance with accuracy. The track between memories is calculated by performing a linear interpolation process. The optimum offset amount is stored in the offset storage circuit 313 in the above-described manner. When the data is recorded in the magnetic track 202 of the discrete area 101, the offset imparting circuit 317 reproduces the offset amount corresponding to the recording subject track to pass the offset amount to the positioning actuator control circuit 318. Then, the positioning actuator control circuit 318 moves the magnetic head by the optimum offset amount toward the radial direction and the recording process is performed, which prevents the recording action of the data into the non-magnetic track 201 of the discrete area 101.

When the maximum amplitude value of the data stored in the amplitude storage decision circuit 312 is smaller than the previously defined amplitude value, there is a possibility that the offset amount does not reach the optimum offset amount. In this case, it is possible that the amplitude storage decision circuit 312 decides such state, the process of recording the measurement pattern is started from the recording start sector again, and the measurement process is also performed again. The offset amount at the recording start sector is set so as to be larger than the offset amount Tmax at the beginning of the previous recording process.

The advantages of the magnetic recording medium of the first embodiment are as follows.

Figure 26:
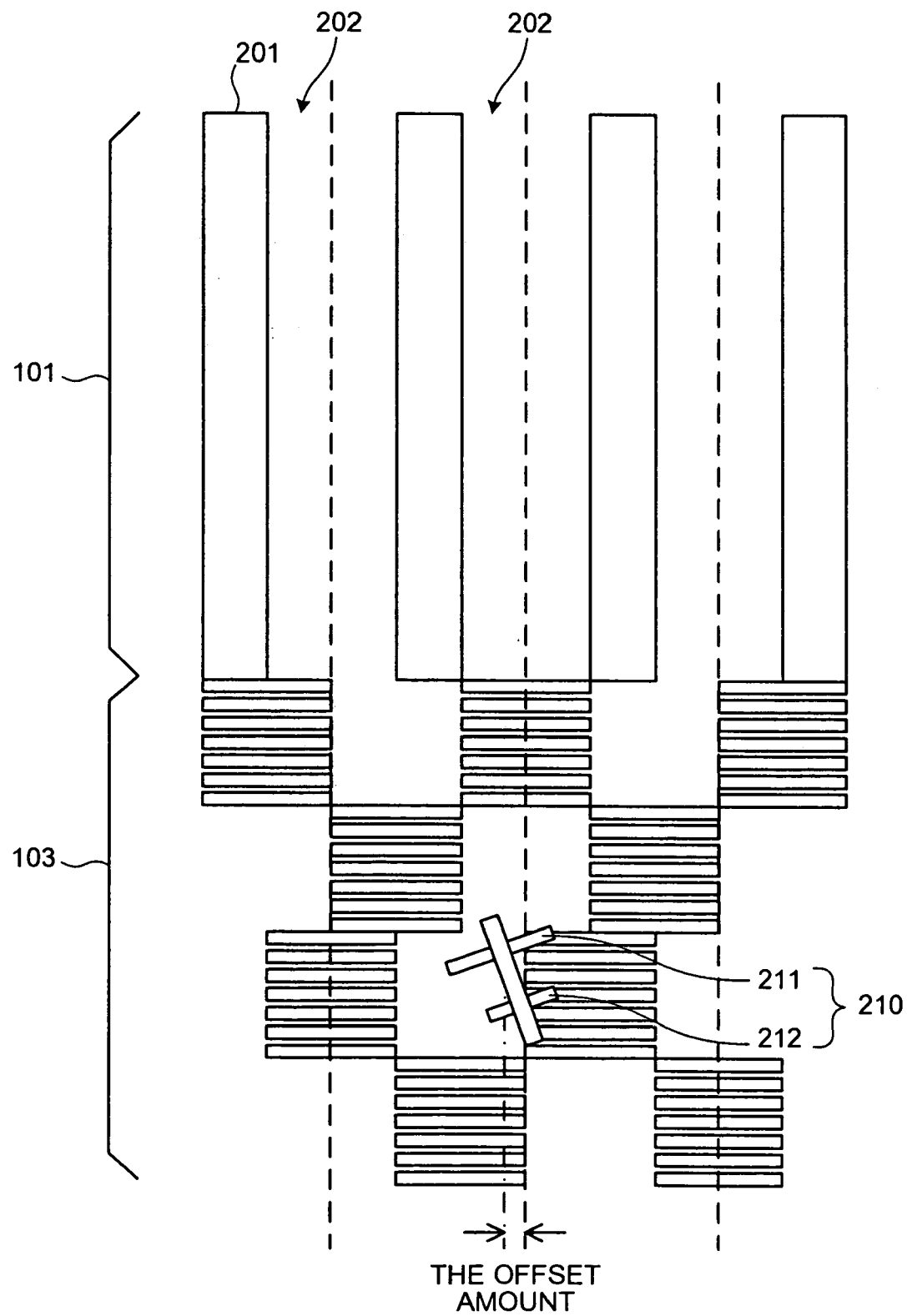
FIG. 26 is a schematic diagram that depicts a composite head and the structure of a recording surface of HDD that is of a discrete track type of magnetic recording medium having the servo area.

As described above, in the conventional technology, the reproducing head is positioned at the track center position, and the reproducing head reproduces the measurement pattern data recorded by the recording head while gradually moved, so that sometimes the offset amount cannot accurately be measured in the discrete track type of magnetic recording medium. As shown in FIG. 26, the non-magnetic tracks 201 are provided so as to sandwich the track center position in the discrete track type of magnetic recording medium. When the reproducing head is positioned at the track center position, the measurement pattern is recorded in the non-magnetic track depending on the track and, as a result, sometimes the measurement pattern cannot be recorded. In this state, when the offset amount is measured, the accurate offset amount cannot be obtained, which results in the problem that the recording and the reproduction cannot be performed into the accurate position of the magnetic recording medium.

On the contrary, the offset amount measurement area 102 is provided in the magnetic recording medium of the first embodiment, the offset amount measurement area 102 is made only of the magnetic material in which the data can be recorded, and the non-magnetic track does not exist in the offset amount measurement area 102. Therefore, even in the case of the discrete track type of magnetic recording medium, the offset amount can be accurately measured and the magnetic recording can be performed at the track center position of the discrete area during recording the data by utilizing the measured offset amount. As a result, a discrete function exerts effectively without degrading the reproduction signal and the good recording/reproduction characteristics can be obtained while extremely high-density magnetic recording can be performed.

In the magnetic recording medium of the first embodiment, since the offset amount measurement area 102 is provided between the servo area 103 and the discrete area 101, when the process of measuring the offset amount is performed after the positioning of the magnetic head, the amount of movement of the magnetic head can be minimized and the process of measuring the offset amount can rapidly be performed.

Further, in the magnetic recording medium of the first embodiment, the measurement data is recorded by the recording head 211 while the reproducing head 212 is positioned at the center position with respect to the offset amount measurement area 102, the measurement data is reproduced by the reproducing head 212 while the reproducing head 212 and the recording head 211 are moved by the predetermined distance toward the radial direction from the position where the reproducing head 212 is positioned, the movements of the reproducing head 212 and the recording head 211 and the readout of the measurement data are performed for a plurality of times, and the amplitude value that becomes the maximum among the amplitude values of the pieces of measurement data stored in the amplitude storage decision circuit 312 is determined as the optimum offset amount. Therefore, even in the case of the discrete track type of magnetic recording medium, the offset amount can be measured in the offset amount measurement area 102 where the non-magnetic track does not exist, and the recording and the reproduction can be performed at the accurate position by accurately measuring the offset amount.

Although the hard disk of the first embodiment has the structure in which the offset amount measurement area 102 is included for each sector, the hard disk is not limited to the first embodiment. It is also possible that the offset amount measurement area 102 is provided only for a predetermined sector.

Although the hard disk of the first embodiment has the structure in which the offset amount measurement area 102 is included for all the tracks, the hard disk is not limited to the first embodiment. It is also possible that the offset amount measurement area 102 is provided only for a predetermined track. In this case, the hard disk drive can be formed so that the optimum offset amount for the tracks except the track in which the optimum offset amount is measured is calculated by performing the interpolation process from the known optimum offset amount.

Then, the structure of the hard disk according to the second embodiment is explained.

In the hard disk of the second embodiment, the offset amount measurement areas are provided on the inner radius side and the outer radius side of the discrete area of the disk.

Figure 12:
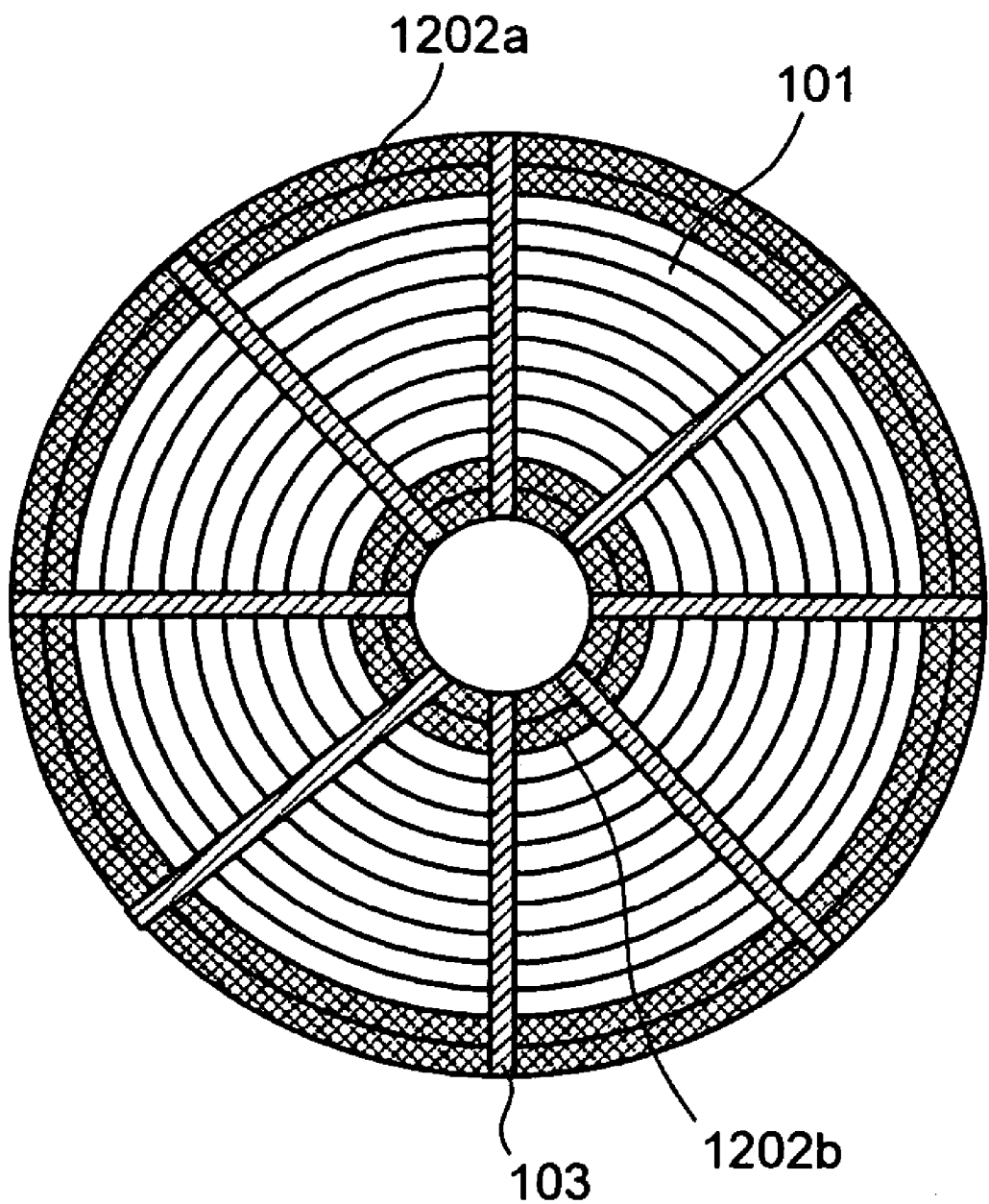
FIG. 12 is a schematic diagram that depicts the structure of the hard disk according to a second embodiment of the invention.

FIG. 12 is a schematic diagram that depicts the structure of the hard disk according to the second embodiment. The hard disk of the second embodiment is the discrete track type of hard disk having the non-magnetic track between the magnetic tracks. Each sector 104 includes the discrete area 101 and the servo area 103. An offset amount measurement area 1202b where the non-magnetic track does not exist is provided on the inner radius side of the discrete area 101 of the innermost radius, and an offset amount measurement area 1202a is provided on the outer radius side of the discrete area 101 of the outermost radius. (In the case that the hard disk is formed in another shape other than disk, the offset amount measurement area can be provided on the inner side and the outer side of the discrete area in a direction crossing the magnetic tracks).

Figure 13:
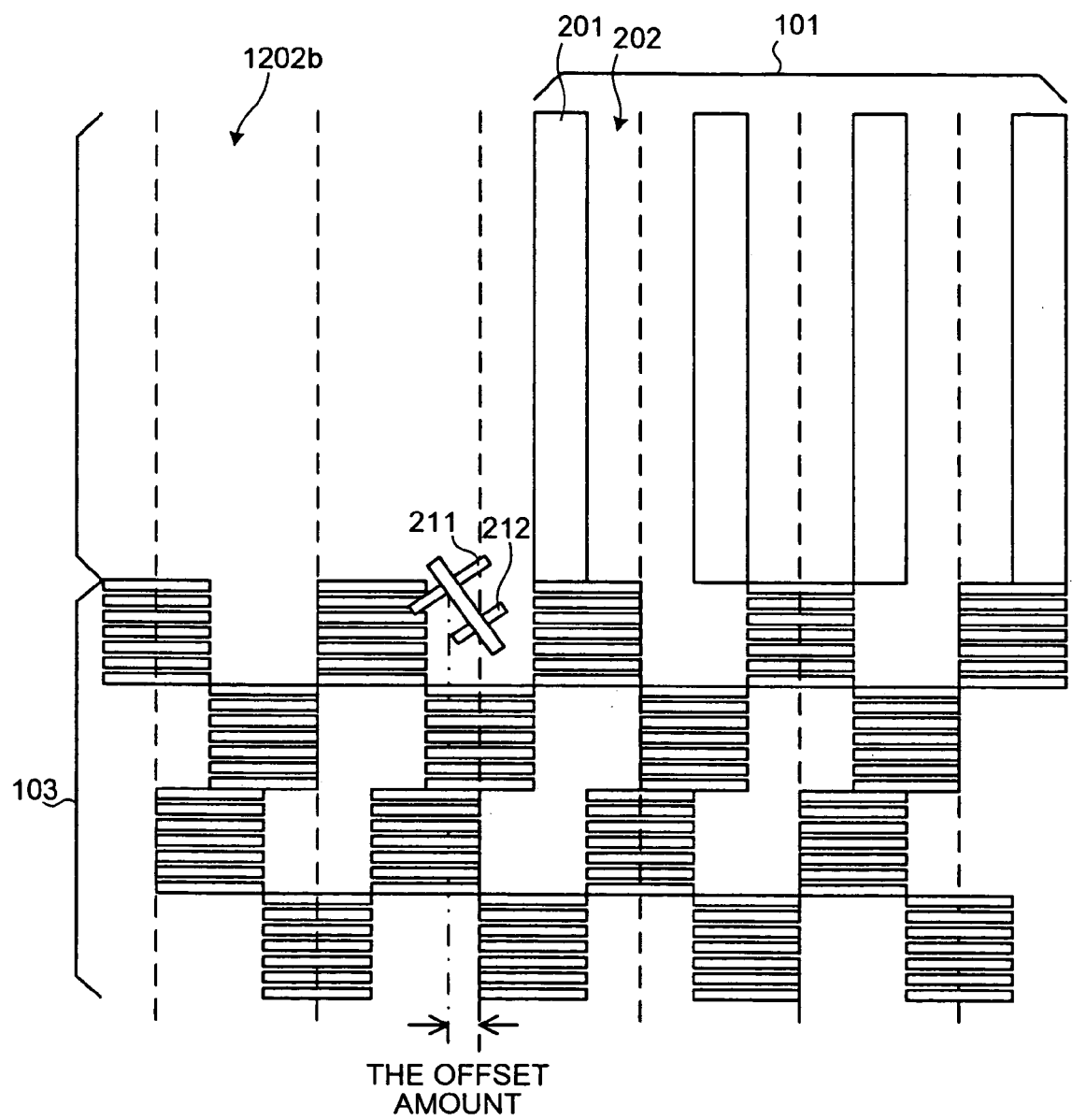
FIG. 13 is a schematic diagram that depicts the detail structures of the discrete area, the offset amount measurement area, and the servo area in the hard disk of the second embodiment.

FIG. 13 is a schematic diagram that depicts the detail structures of the discrete area 101, the offset amount measurement areas 1202a and 2102b, and the servo area 103 in the hard disk of the second embodiment. The discrete area 101 and the servo area 103 have the same functions as the hard disk of the first embodiment.

The offset amount measurement areas 1202a and 1202b are the area in which the offset amount that is of the relative distance between the reproducing head and the recording head of HDD in the radial direction of the recording medium is measured. The offset amount measurement area 1202a is provided on the outer radius side of the discrete area 101 of the outermost radius, and the offset amount measurement area 1202b where the non-magnetic track does not exist is provided on the inner radius side of the discrete area 101 of the innermost radius. Therefore, the process of initializing the hard disk can efficiently be performed.

The hard disk drive of the second embodiment is similar to that of the first embodiment shown in FIG. 3 in the configuration.

Figure 14:
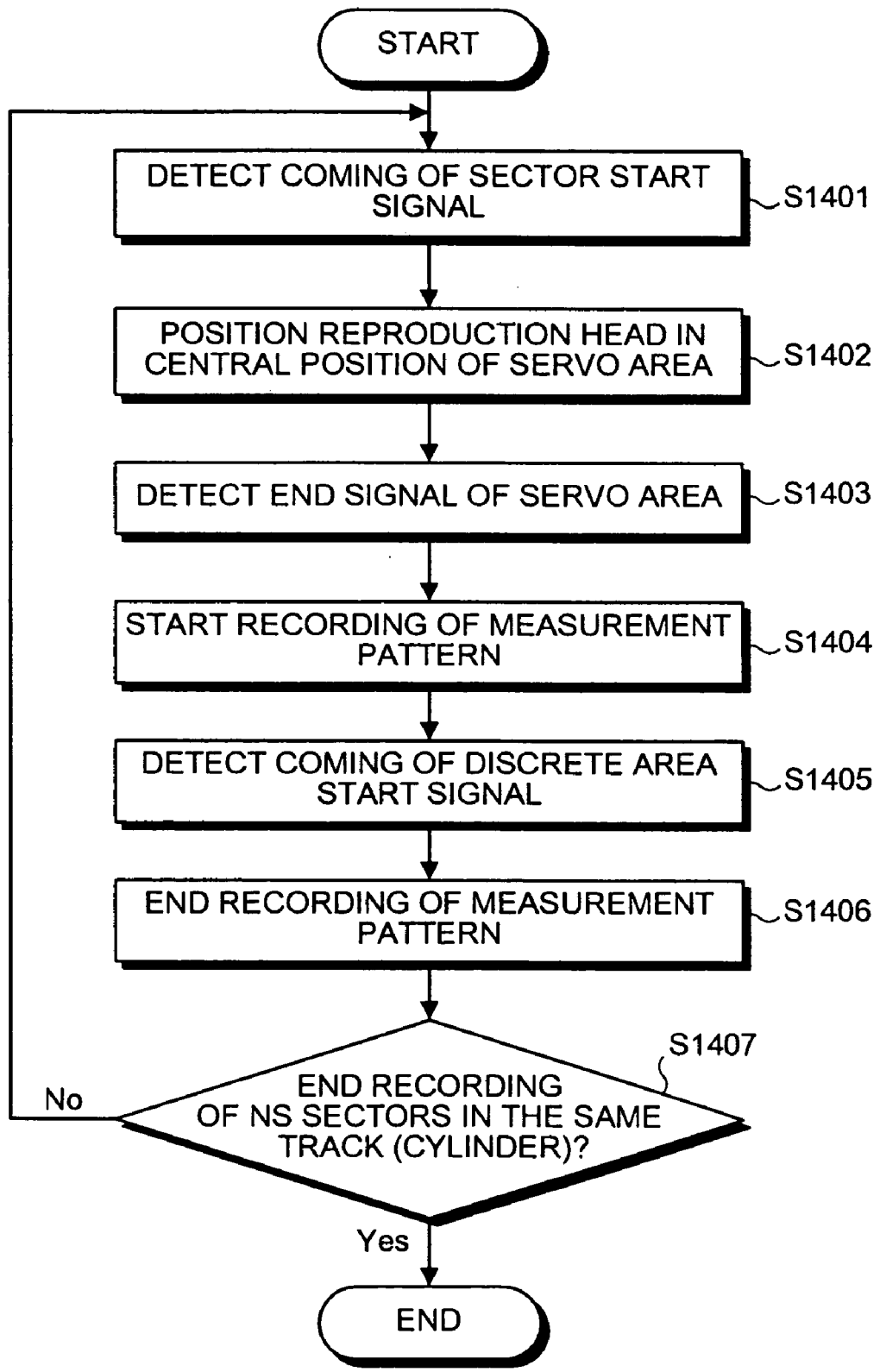
FIG. 14 is a flow chart that depicts the procedure of the process of recording the measurement pattern.

Then, the process of measuring the offset amount is explained in the hard disk drive according to the second embodiment having the above-described configuration. In the hard disk drive of the embodiment, the process of measuring the offset amount is also performed in two stages of the process of recording the measurement pattern and the process of measuring the offset from the recorded measurement pattern. FIG. 14 is a flow chart that depicts the procedure of the process of recording the measurement pattern.

The offset measuring process and adjusting process according to the second embodiment are also started while the initialization is performed to the offset amount measurement areas 1202a and 1202b where the non-magnetic track does not exist and the magnetic information on the data is not recorded in the offset amount measurement areas 1202a and 1202b.

The system controller 311 output the offset adjustment start command. The positioning actuator control circuit 318 receives the offset adjustment start command and move the suspension arm 322 to the innermost radius in the disk. In this state, the head reproduction signal processing circuit 315 waits for the coming of the sector area start signal (Step S1401).

When the head reproduction signal processing circuit 315 receives the sector area start signal, the system controller 311 positions the reproducing head 212 at the center position of the servo area 103 (Step S1402). When the system controller 311 detects the end of the servo signal from the head reproduction signal processing circuit 315 (Step S1403), the system controller 311 performs the recording action of the measurement pattern with the recording head 211 to the subsequently coming offset amount measurement areas 1202a and 1202b (Step S1404).

When the system controller 311 receives the trigger signal indicating the coming of the next sector (Step S1405), the system controller 311 stops the recording of the measurement pattern (Step S1406). When the system controller 311 ends the recording of the measurement data for the Ns sectors on the same condition (Step S1407), the recording process for the offset adjustment is ended to transfer to the process of measuring the offset amount.

Figure 15:
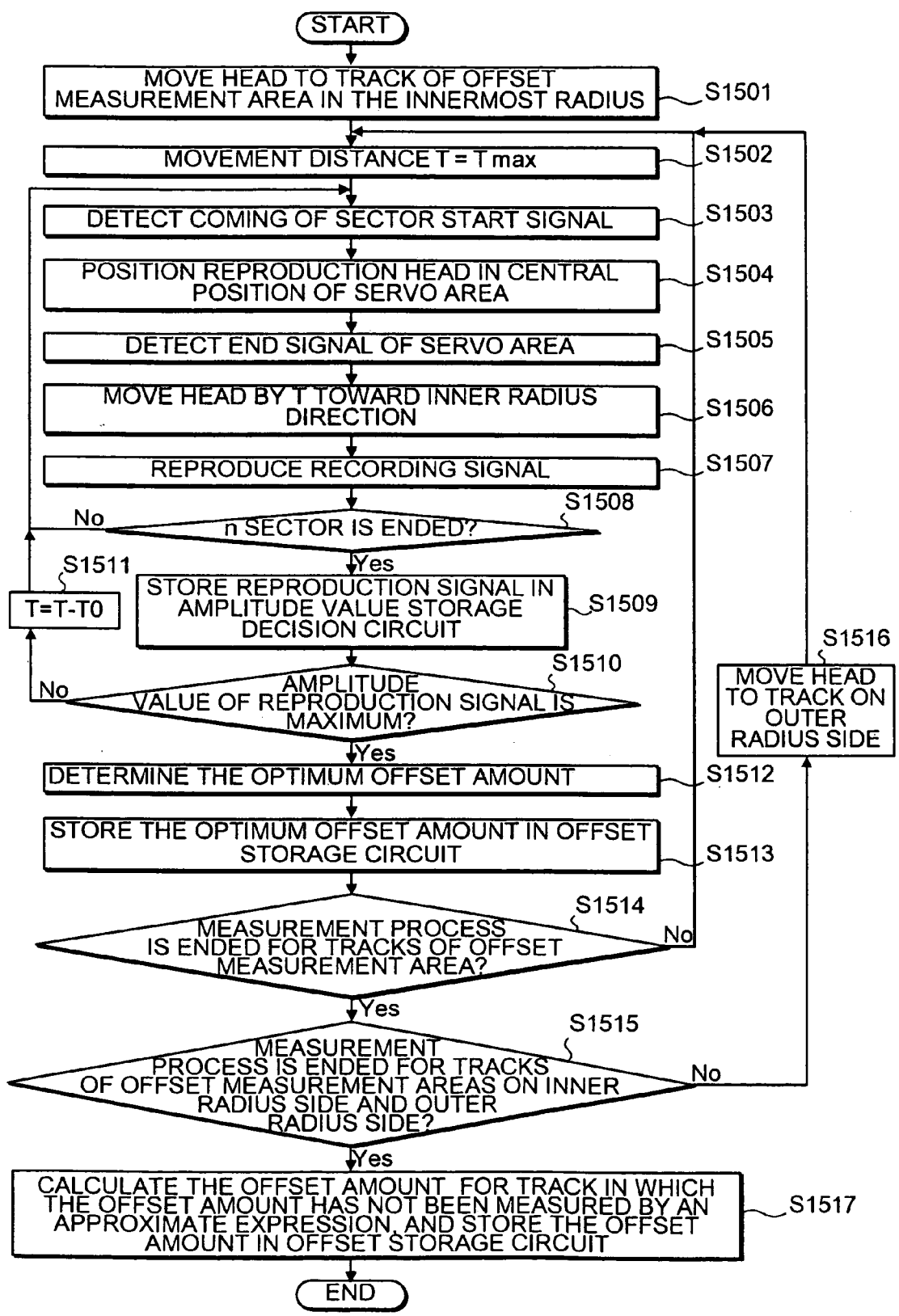
FIG. 15 is a flow chart that depicts the procedure of the process of measuring the offset amount.

FIG. 15 is a flow chart that depicts the procedure of the process of measuring the offset amount. The magnetic head 210 is moved to the offset amount measurement area 1202b on the inner radius side of the discrete area 101 of the innermost radius in the disk (Step S1501). T indicating the movement distance of the magnetic head 210 toward the radial direction is initialized by Tmax (Step S1502). When the system controller 311 receives the coming of the recording start sector (Step S1503), the reproducing head 212 is positioned at the center position of the discrete area 101 shown by the servo area 103 (Step S1504).

In the passage of the magnetic head 210 through the servo area 103 of the recording start sector, when the flag signal for giving the information on the passage of the magnetic head 210 through the servo area 103 is detected (Step S1505), the magnetic head 210 is moved by the distance T (Tmax in the first time) toward the inner radius direction from the track center position shown by the reproducing head 212 (Step S1506).

It is also possible that the movement direction is the outer radius direction of the recording medium. The reproducing head 212 reproduces the measurement pattern recorded in the offset amount measurement areas 1202a and 1202b (Step S1507). Similarly to the first embodiment, the measurement value is the amplitude value of the reproduction signal having the fixed frequency pattern, which is recorded in the offset amount measurement areas 1202a and 1202b having no non-magnetic track through the recording process.

As in the case of the recording action, the measurement of the amplitude value of the reproduction signal is ended by receiving the trigger signal generated at timing slightly earlier than the coming of the discrete area 101. The measurement processes from Step S1503 to Step S1507 are repeatedly performed to given n sectors (Step S1508), and the offset amount is stored in the amplitude storage decision circuit 312 as the amplitude data when the offset amount is set to Ts toward the inner radius side (Step S1509). Comparing the previous offset amount stored in the amplitude storage decision circuit 312 and the current offset amount, the amplitude storage decision circuit 312 decides whether the amplitude value of the current offset amount becomes the maximum (Step S1510). When the amplitude value of the current offset amount does not become the maximum, T is set to T−T0 (Step S1511), and the processes from Step S1503 to Step S1509 are repeated. Therefore, the magnetic head 210 is changed from the state in which the magnetic head 210 is moved by the distance T toward the inner radius side of the disk to the state in which the magnetic head 210 is moved by the distance T0 toward the outer radius side of the disk, and the process of measuring the offset from Step S1503 to Step S1509 is performed.

When the amplitude storage decision circuit 312 decides that the amplitude value of the current offset amount becomes the maximum in Step S1510, the current offset amount is determined as the optimum offset amount Topt in the track on processing (Step S1512), and the current offset amount is stored in offset storage circuit 313 (Step S1513).

The measurement processes from Step S1502 to Step S1513 are performed to all the tracks of the offset amount measurement area 1202b on the inner radius side. When the measurement processes are ended for all the tracks of the offset amount measurement area 1202b on the inner radius side (Step S1514), the magnetic head 210 is moved to the offset amount measurement area 1202a on the outer radius side of the discrete area 101 of the outermost radius in the disk (Step S1515 and Step S1516). As in the case of the process of measuring the offset amount for the offset amount measurement area 1202b on the inner radius side, the measurement processes from Step S1502 to Step S1513 are performed.

When the optimum amounts of offset are determined for all the tracks of the offset amount measurement areas 1202a and 1202b on the inner and outer radius sides in the above-described way (Step S1515), the optimum offset amount of the track in which the offset amount is not measured is determined by performing the interpolation process in which the optimum amounts of offset measured from the offset amount measurement areas 1202a and 1202b on the inner and outer radius sides are approximated by polynomials of the following equation (1) (Step S1517). The equation (1) is the cubic, quartic, and n-th order polynomials for calculating the optimum offset amount offset(k) of the k track. Generally coefficients are determined by a least squares method.

Equation (1):

$$\text{offset}(k) = a3 \times k^3 + a2 \times k^2 + a1 \times k^1 + a0 \cdots \text{cubic polynomial}$$

$$\text{offset}(k) = a4 \times k^4 + a3 \times k^3 + a2 \times k^2 + a1 \times k^1 + a0 \cdots \text{quartic polynomial}$$

$$\text{offset}(k) = \sum_0^n a_n \times k^n \cdots \text{n-th polynomial}$$

For example, when the total number of tracks is 65591, it is considered that the optimum offset amount is measured in each 1000 tracks to interpolate the amounts of offset of other tracks by the equation (1). When the approximation is performed by the cubic polynomial in the equation (1), there is an estimated error up to about 6 nm. When the approximation is performed by the quartic polynomial in the equation (1), the estimated error remains within about 1 nm. When the optimum amounts of offset are measured at five points (two points in the track on the inner radius side, one point in the track near the radial center, and two points in the track on the outer radius side), and the approximation is performed by the quartic polynomial, the estimated error remains within about 2 nm.

Figure 16:
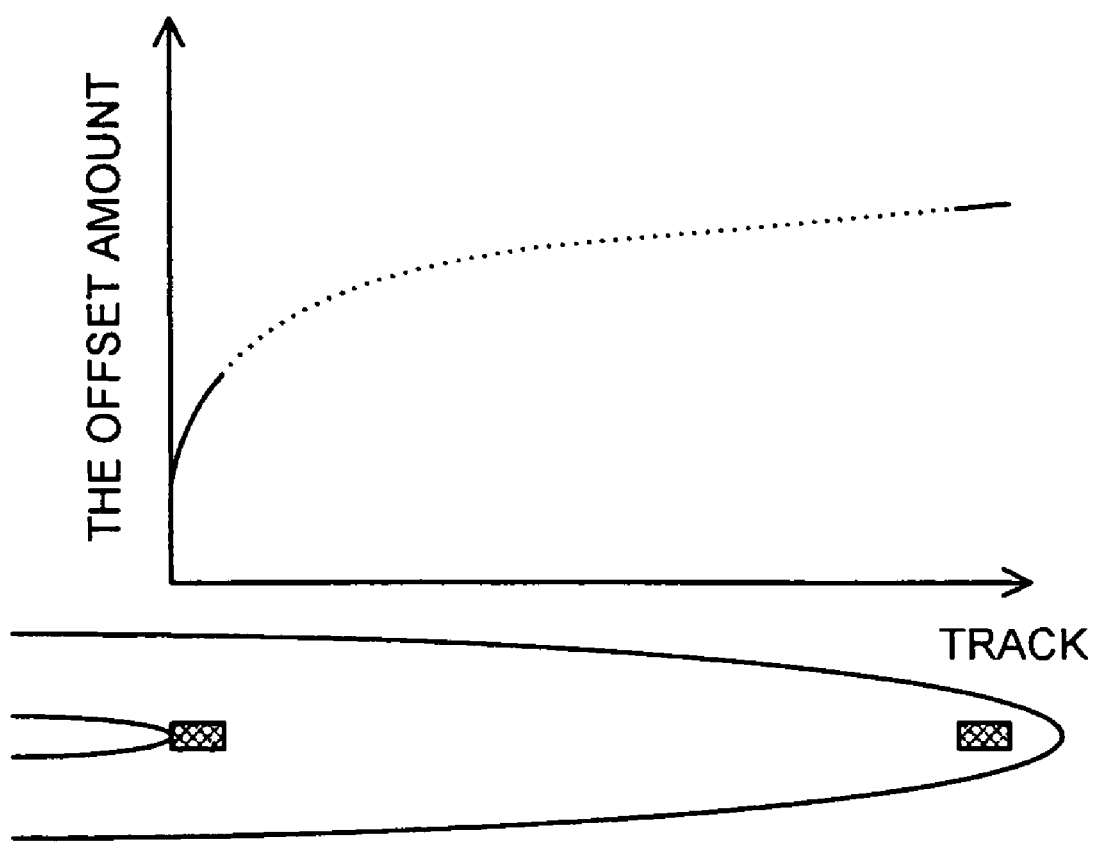
FIG. 16 is an explanatory view that depicts the relationship between the offset amount and the track.

FIG. 16 is an explanatory view that depicts the relationship between the offset amount and the track. The optimum amounts of offset measured from the offset amount measurement areas 1202a and 1202b on the inner and outer radius sides is indicated by the solid line. In addition, the optimum offset amount can be calculated for the tracks in which the measurement is not performed by utilizing the approximate expressions.

As described above, in the hard disk and the hard disk drive of the second embodiment, similarly to the first embodiment, the offset amount can be accurately measured and the magnetic recording can be performed at the center position of the discrete area during recording the data by utilizing the measured offset amount. As a result, the discrete function exerts effectively without degrading the reproduction signal and the good recording/reproduction characteristics can be obtained while the extremely high-density magnetic recording can be performed.

In the hard disk of the second embodiment, because the offset amount measurement area is provided on the inner radius side of the discrete area of the innermost radius in the hard disk and the offset amount measurement area is provided on the outer radius side of the discrete area of the outermost radius in the hard disk, when compared with the case in which the offset amount measurement area is provided in each sector, the time necessary for a formatting process is shortened, and the efficiency of the formatting process of the hard disk can be improved.

The structure of the hard disk according to a first modification of the second embodiment is explained below.

Figure 17:
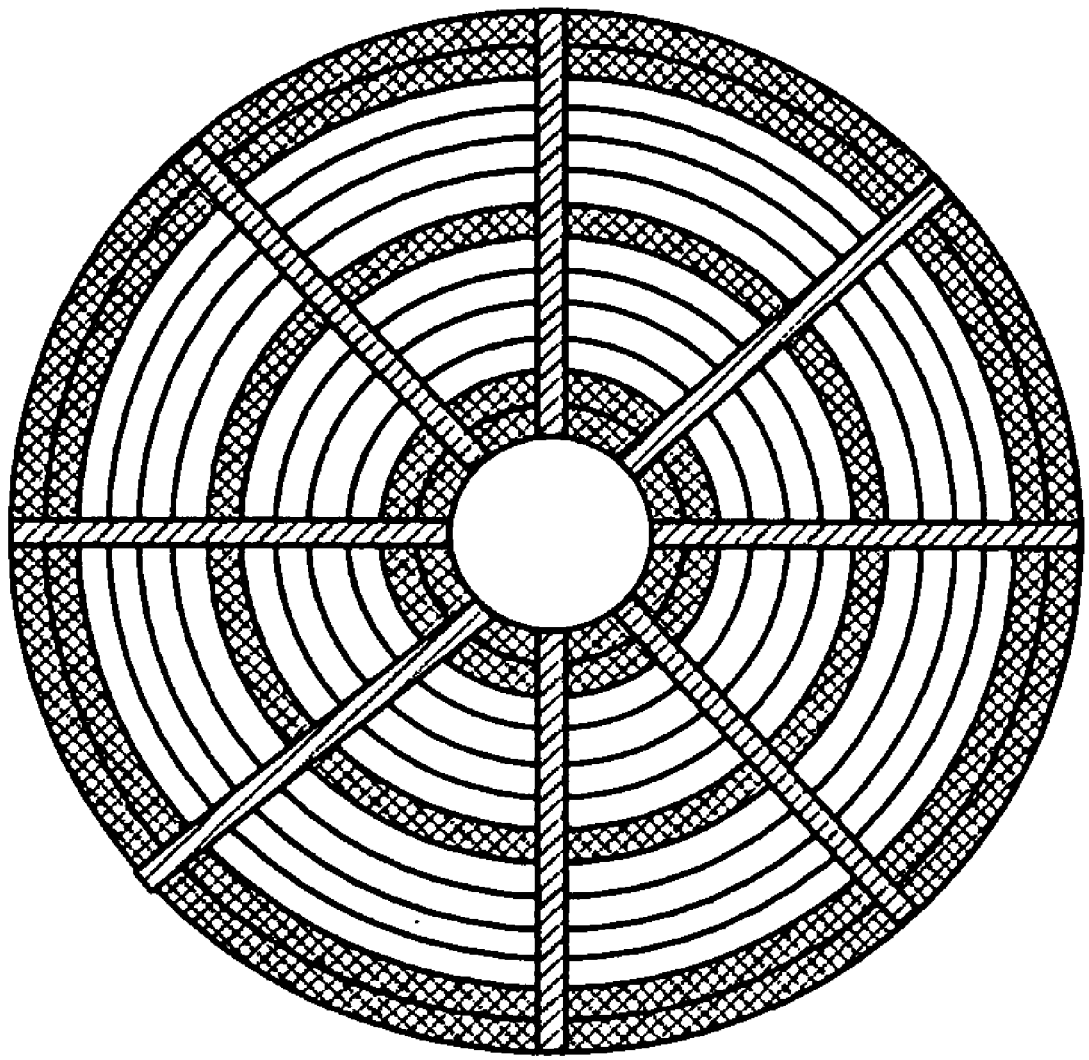
FIG. 17 is a schematic diagram that depicts the structure of the hard disk in which the offset amount measurement area is formed in the track near the center of the disk.
Figure 18:
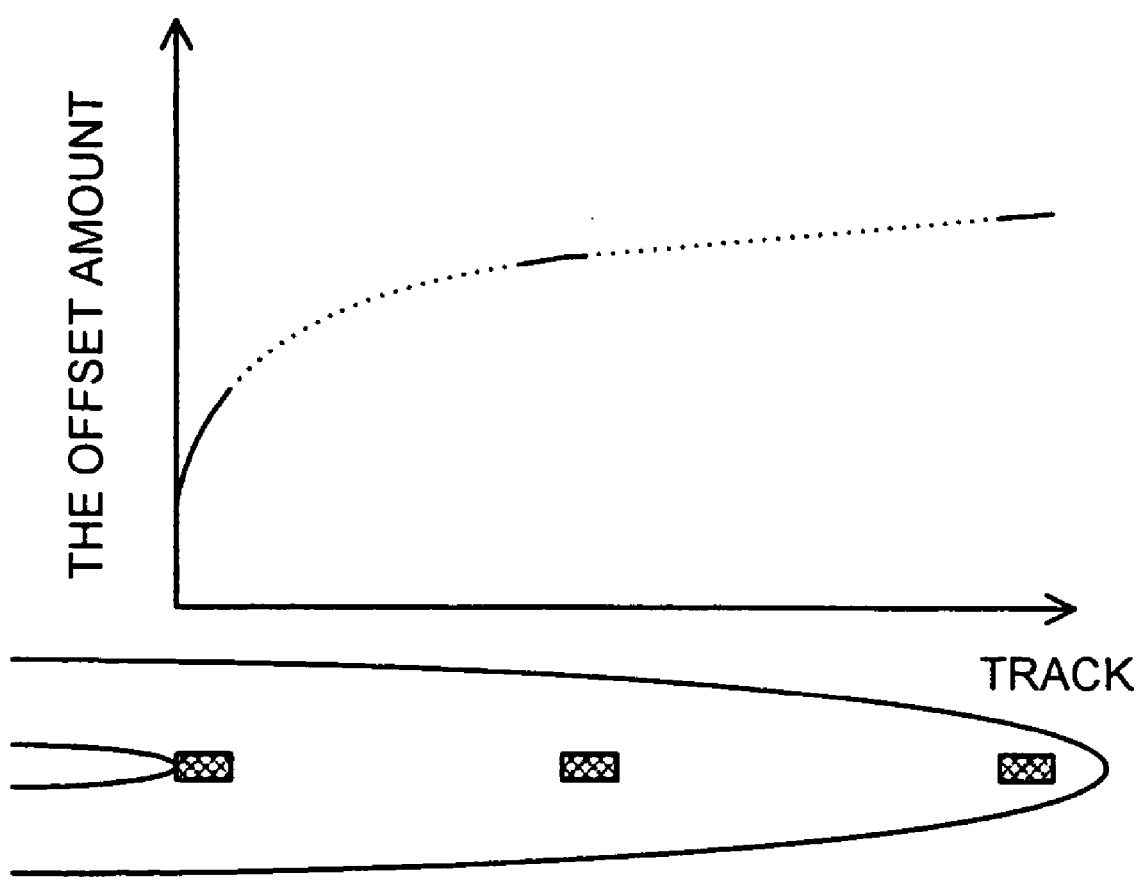
FIG. 18 is an explanatory view graphing an example of the optimum offset amount in each track stored in the offset storage circuit.

In the hard disk mentioned above in the second embodiment, the offset amount measurement area 1202b is provided on the inner radius side of the discrete area 101 of the innermost radius and the offset amount measurement area 1202a is provided on the outer radius side of the discrete area 101 of the outermost radius. As shown in FIG. 17, it is also possible that an offset amount measurement area 1202c is provided in the track near the center of the disk. In this case, as shown in FIG. 18, because the optimum offset amount can be measured from the offset amount measurement area 1202c in the track near the center of the disk, there is the advantage that calculation accuracy of the optimum offset amount by the equation (1) is improved for the track in which the measurement is not performed.

The structure of the hard disk according to a second modification of the second embodiment is explained below.

Figure 19:
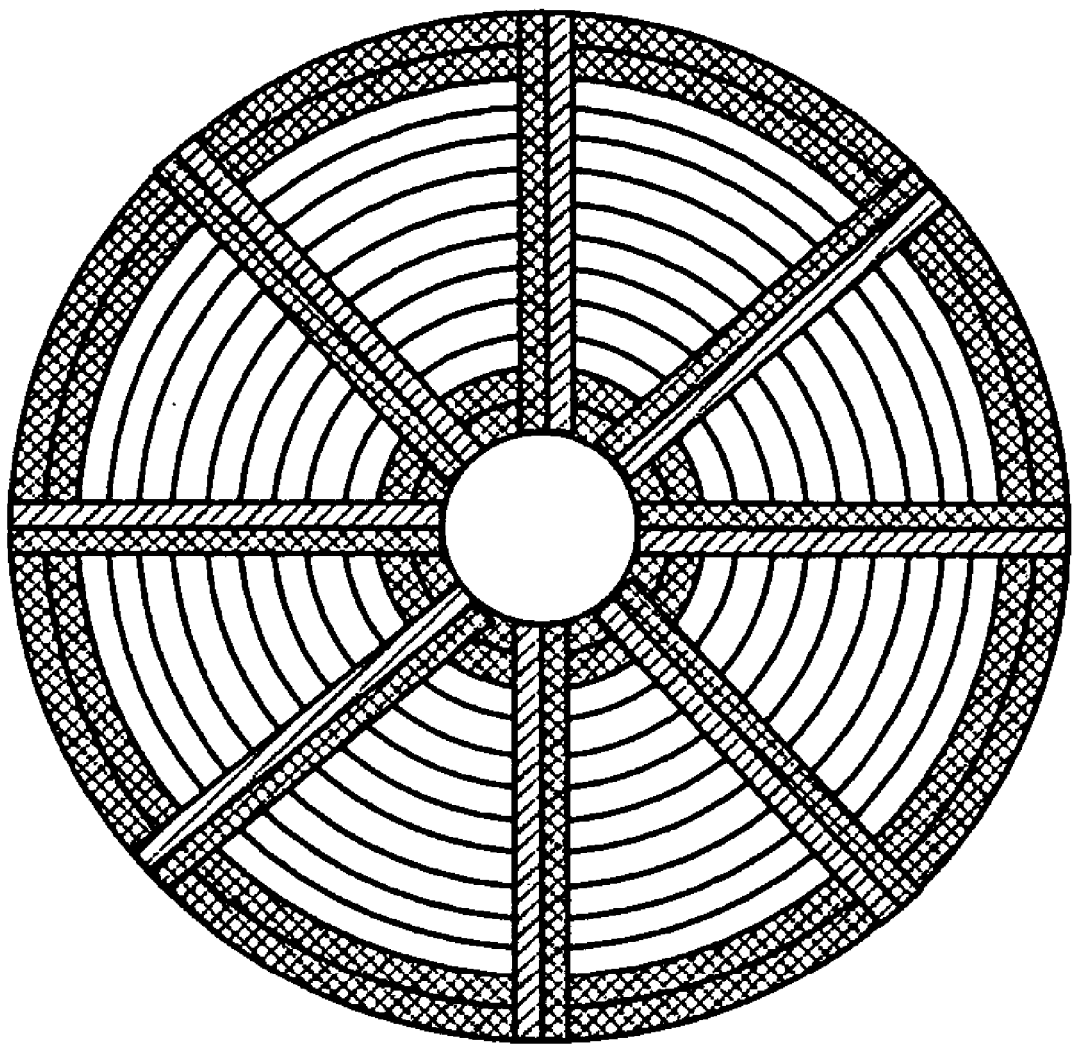
FIG. 19 is a schematic diagram that depicts the structure of the hard disk in which the offset amount measurement area is formed through a radial direction of the disk.

Instead of the provision of the offset amount measurement area 1202c in the track near the center of the disk like the first modification, as shown in FIG. 19, it is also possible that an offset amount measurement area 1202d is provided through the radial direction of the disk like the first embodiment. In this case, in addition to the offset amount measurement areas 1202a and 1202b on the inner and outer radius sides, because the optimum offset amount can be measured from an arbitrary track of the offset amount measurement area 1202d provided through the radial direction of the disk, there is the advantage that the calculation accuracy of the optimum offset amount by the equation (1) can further be improved for the track in which the measurement is not performed.

The structure of the hard disk according to the third embodiment is explained.

In the hard disks of the first embodiment and the second embodiment, the center position of the magnetic track coincides with the center position of the servo area in any sector. On the other hand, the hard disk according to the third embodiment has both the sector in which the center position of the magnetic track coincides with the center position of the servo area and the sector in which the center position of the magnetic track differs from the center position of the servo area.

Figure 20:
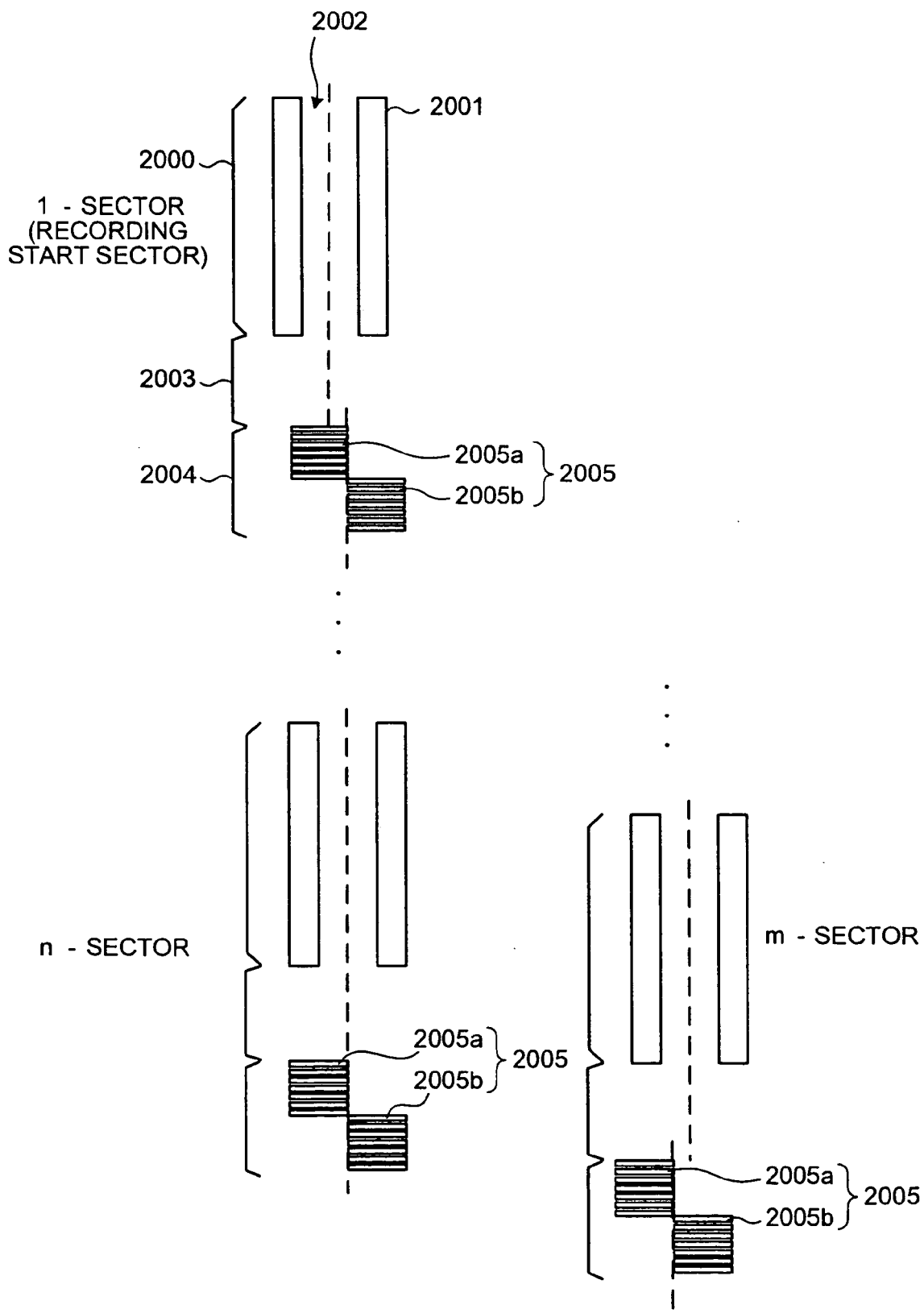
FIG. 20 is a schematic diagram that depicts the structure in each sector of the hard disk according to a third embodiment of the invention.

FIG. 20 is a schematic diagram that depicts the structure in each sector of the hard disk according to the third embodiment. As shown in FIG. 20, a discrete area 2000 includes the magnetic track 2002 made of the magnetic material in which the data can be recorded and the non-magnetic track 2001 in which the data can not be recorded. The non-magnetic track 2001 is provided between the magnetic tracks 2002. In 1-sector which is of the recording start sector, the track center position (the first center position) of the magnetic track 2002 coincides with the center position (the second center position) among signal recording areas 2005a and 2005b of a burst signal area 2005 of a servo area 2004. On the other hand, in n-sector and m-sector, the track center position of the magnetic track 2002 differs from the center position of the servo area 2004. As shown in FIG. 20, the n-sector differs from the m-sector in the difference between the track center position of the magnetic track 2002 and the center position among signal recording areas 2005a and 2005b. In the hard disk according to third embodiment, the sector in which the track center position of the magnetic track 2002 differs from the center position of the servo area 2004 is provided at the track of the innermost radius of the disk. In addition to the track of the innermost radius of the disk, it is possible that the tracks that are the predetermined distance away from the center of the disk have the above-described structure.

The hard disk drive of the second embodiment is similar to that of the first embodiment shown in FIG. 3 in the configuration.

Figure 21:
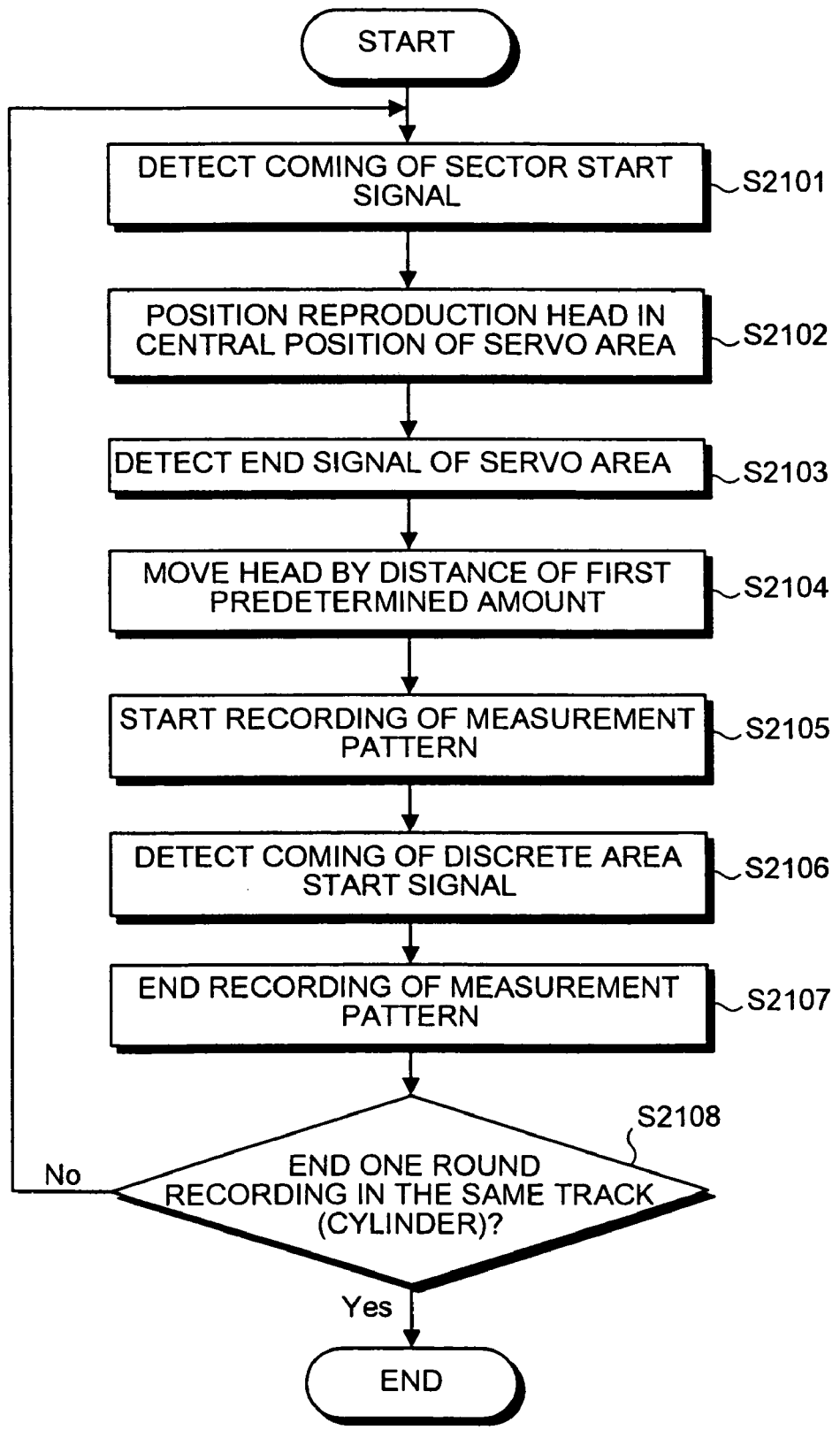
FIG. 21 is a flow chart that depicts the procedure of the process of recording the measurement pattern.

Then, the process of measuring the offset amount is explained in the hard disk drive according to the third embodiment having the above-described configuration. In the hard disk drive of the third embodiment, similarly to the first embodiment and the second embodiment, the process of measuring the offset amount is also performed in two stages of the process of recording the measurement pattern and the process of measuring the offset from the recorded measurement pattern. FIG. 21 is a flow chart that depicts the procedure of the process of recording the measurement pattern.

Similarly to the first embodiment and the second embodiment, the offset measuring process and adjusting process of the embodiment are started while the initialization is performed and the magnetic information on the data is not recorded in the offset amount measurement area 2003 where the non-magnetic track does not exist. In this state, the suspension arm 322 for supporting the magnetic head 210 on which the reproducing head 212 and the recording head 211 are mounted moves the magnetic head 210 to the innermost radius in the disk. At this point, when the axis of the magnetic head 210 is equal to the axis of the suspension arm 322, in the positional relationship of the reproducing head 212 and the recording head 211 with respect to the discrete area 2000, when the center of the reproducing head 212 is positioned with respect to the center of the track, the center position of the recording head 211 is shifted from the center of the track.

The system controller 311 output the offset adjustment start command. The positioning actuator control circuit 318 receives the offset adjustment start command to move the suspension arm 322 to the innermost radius in the disk. In this state, the head reproduction signal processing circuit 315 waits for the coming of the sector area start signal (Step S2101).

When the head reproduction signal processing circuit 315 receives the sector area start signal, the system controller 311 displaces the positioning actuator 323 based on the reproduction signal from the servo area 2004 to position the reproducing head 212 at the center position of the servo area 2004 (Step S2102).

Figure 22:
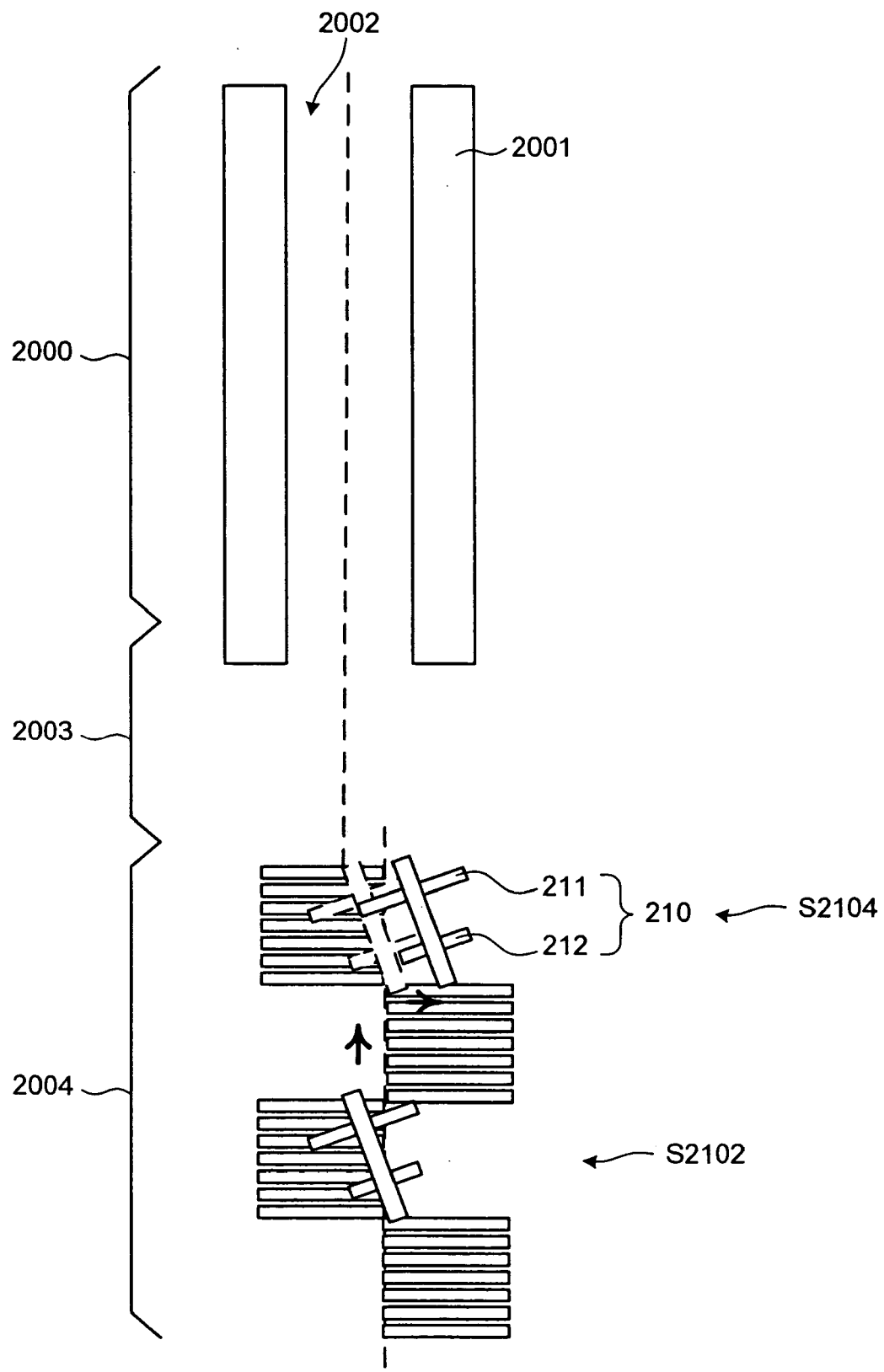
FIG. 22 is an explanatory view that depicts the position of the magnetic head in Step S2102 and Step S2104 of FIG. 21.

When the system controller 311 detects the end of the servo signal from the head reproduction signal processing circuit 315 (Step S2103), the system controller 311 imparts the first predetermined offset amount to the positioning actuator control circuit 318 to move the magnetic head 210 by the first predetermined amount toward the outer radius direction (Step S2104). Then, the system controller 311 performs the recording action of the measurement pattern with the recording head 211 to the subsequently coming offset amount measurement area 2003 made only of the magnetic material (Step S2105). FIG. 22 is an explanatory view that depicts the position of the magnetic head 210 in Step S2102 and Step S2104.

Similarly to the first embodiment, the measurement pattern recorded in Step S2105 is the bit pattern changed at the predetermined frequency.

When the system controller 311 receives the trigger signal indicating the coming of the discrete area 2000 (Step S2106), the system controller 311 stops the recording of the measurement pattern (Step S2107).

The processes from Step S2101 to Step S2107 are repeatedly performed from the recording start sector in which the recording process is started until one round recording is ended for the same cylinder (Step S2108). That is, in the same cylinder, while the offset amount for the recording remains at a constant value of the first predetermined amount in Step S2104, the recording action is completed.

Figure 23:
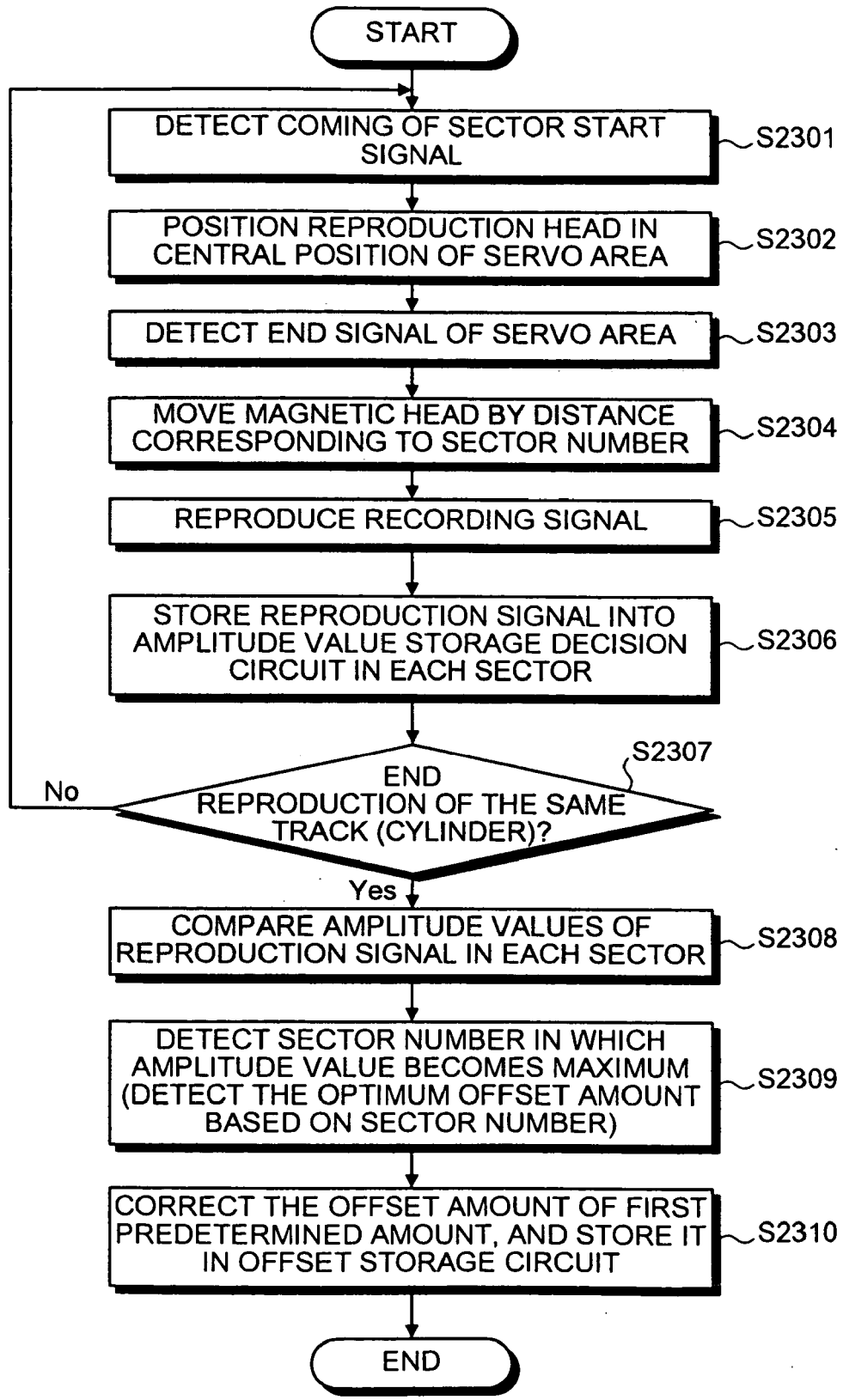
FIG. 23 is a flow chart that depicts the procedure of the process of measuring the offset amount.

FIG. 23 is a flow chart that depicts the procedure of the process of measuring the offset amount. In the third embodiment, the recording signal is reproduced while the reproducing head 212 positioned at the center of the servo area 2004 is moved to the distance corresponding to the sector number of the sector in the radial direction. That is, the hard disk of the invention has the magnetic track 2002 formed so that the center position differs from the center position of the servo area 2004, and the relationship between the track center position of the magnetic track 2002 and the center position of the servo area 2004 is the value previously determined corresponding to the sector number of the sector. The recording signal is reproduced at the track center position of the magnetic track 2002 subsequent to the servo area 2004 by utilizing the above-described relationship, so that the necessary offset amount is determined from the sector number.

The measuring process is started from the recording start sector. When the system controller 311 receives the coming of the recording start sector (Step S2301), the reproducing head 212 is positioned at the center position of the discrete area 2000 shown by the servo area 2004 (Step S2302).

Figure 24:
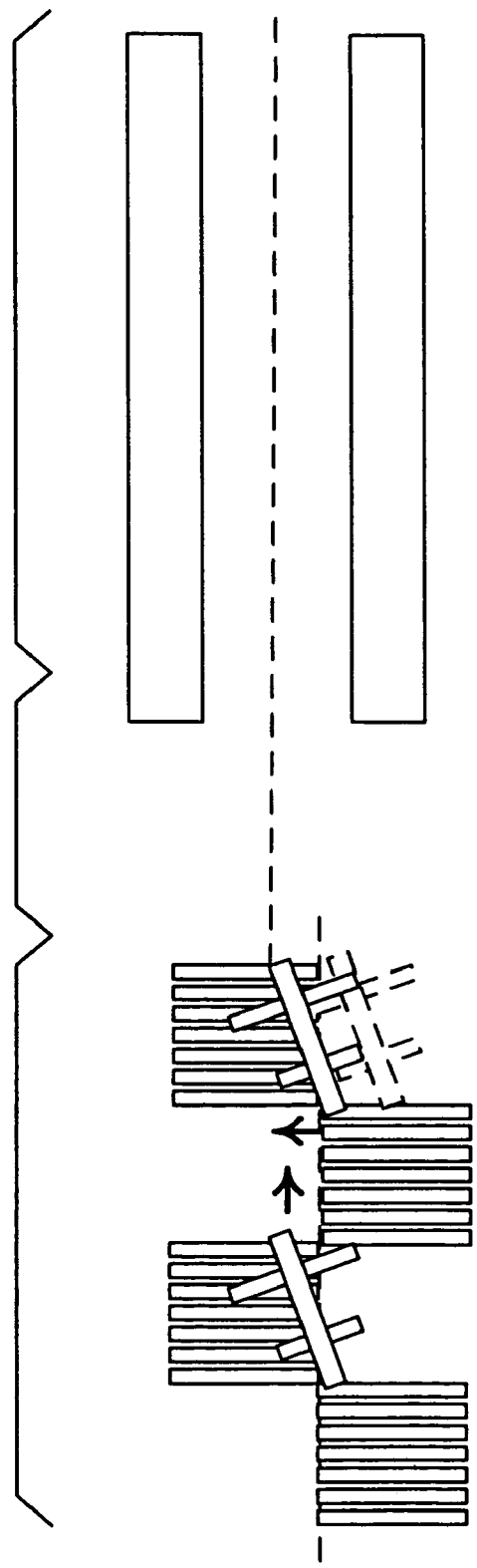
FIG. 24 is an explanatory view that depicts the position of the magnetic head in Step S2302 and Step S2304 of FIG. 23.

In the passage of the magnetic head 210 through the servo area 2004 of the recording start sector, when the flag signal for giving the information on the passage of the magnetic head 210 through the servo area 2004 is detected (Step S2303), the magnetic head 210 is moved by the distance corresponding to the sector toward the inner radius direction from the track center position shown by the reproducing head 212 (Step S2304). FIG. 24 is an explanatory view that depicts the position of the magnetic head 210 in Step S2302 and Step S2304.

As described above, the offset amount in which the magnetic head 210 is moved in Step S2304 is the value previously determined in each sector, and the offset amount is stored in the offset storage circuit 313. FIG. 25 is an explanatory view that depicts an example of the table in which the offset amount is determined in each sector number.

In this state, the reproducing head 212 reproduces the measurement pattern recorded in the offset amount measurement area 2003 (Step S2305), and the amplitude value of the reproduction signal is stored in the amplitude storage decision circuit 312 (Step S2306). The reproduction processes from Step S2301 to Step S2306 are repeatedly performed until the reproduction processes are ended for all the sectors in the same track (Step S2307).

The reproduction signal is obtained by reproducing the signal recorded in the previous recording sequence. When the first predetermined amount that is of the offset amount for the recording is the proper value, the amplitude of the reproduction signal becomes the maximum in the sector provided so that the center position of the magnetic track 2002 is equal to the center position of the servo area 2004.

On the other hand, when the first predetermined amount that is of the offset amount is not the proper value, the amplitude of the reproduction signal becomes the maximum in the sector in which the center position of the magnetic track 2002 is shifted by a second predetermined amount from the center position of the servo area 2004.

Therefore, the amplitude storage decision circuit 312 compares the amplitude of the reproduction signals for all the sector areas in the same track (Step S2308) to obtain the sector area and the sector number (Step S2309). As a result, when the amplitude of the reproduction signal becomes the maximum in the sector area in which the center position of the magnetic track 2002 is shifted by the second predetermined amount from the center position of the servo area 2004, the first predetermined offset amount stored in the offset storage circuit 313 is corrected by the offset amount corresponding to the second predetermined amount, and the offset amount that is of the corrected first predetermined amount is stored in the offset storage circuit 313 (Step S2310).

As described above, in the hard disk and the hard disk drive of the third embodiment, similarly to the first embodiment, the offset amount can be accurately measured and the magnetic recording can be performed at the track center position of the discrete area during recording the data by utilizing the measured offset amount. As a result, the discrete function exerts effectively without degrading the reproduction signal and the good recording/reproduction characteristics can be obtained while the extremely high-density magnetic recording can be performed.

The hard disk of the third embodiment has both the sector in which the center position of the magnetic track 2002 coincides with the center position of the servo area 2004 and the sector in which the track position of the magnetic track 2002 differs from the track center position of the servo area 2004. The hard disk drive compares the amplitudes of the reproduction signals for all the sector areas in the same track to determine the sector area and sector number in which the amplitude of the reproduction signal becomes the maximum. When the amplitude of the reproduction signal becomes the maximum in the sector area in which the center position of the magnetic track 2002 is shifted by the value of the second predetermined amount from the center position of the servo area 2004, the offset amount of the first predetermined amount is corrected by the offset amount corresponding to the second predetermined amount, so that the measurement of the offset amount neat the center of the disk and the adjustment by the offset amount during the recording can be easily performed when the reproducing head 212 and the recording head 211 are arranged with a narrow interval in the miniaturized magnetic head 210.

In the process of measuring the offset amount, the offset amount of the magnetic head 210 is previously determined in accordance with the sector area near the center of disk. However, when the offset amount is corrected only at the predetermined radial position at once, the offset amount can easily be corrected at all the radial positions from the inner radius to the outer radius by the same amount of correction.

Similarly to the first embodiment and the second embodiment, in comparing the amplitude values of the reproduction signals, when the amplitude value does not exceed the predetermined value in the sector area where the amplitude value becomes the maximum, or when the sector area where the amplitude value becomes the maximum is not obtained, the offset amount of the first predetermined amount is set to the larger value, and the process of recording the measurement data is performed again, and the correction value of the more proper offset amount can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for measuring the offset amount, which measures the offset amount for a discrete track type of magnetic recording medium including a discrete area that has a plurality of magnetic tracks where data can be recorded and that has a non-magnetic track where the data can not be recorded located between the plurality of adjacent magnetic tracks; and an offset amount measurement area formed only by magnetic material where data can be recorded, the offset amount measurement area being separated from the discrete area, the method for measuring the offset amount comprising:

recording the measurement data with the recording head while the reproducing head is positioned at a predetermined track in the offset amount measurement area;

reproducing the measurement data with the reproducing head while the reproducing head and the recording head are moved in a direction crossing the magnetic track and storing the reproduced measurement data in a storage unit; and performing a plurality of reproducing movements of the reproducing head in a plurality of different positions of the reproducing head and determining the offset amount based on a plurality of measurement data reproduced by the reproducing head and a plurality of measurement data stored in the storage unit, including determining whether a current offset amount for a currently reproduced measurement data is a maximum amount, and when the determining determines that the current offset amount is the maximum, storing the determined offset amount as an optimum offset amount.

2. A method for measuring the offset amount, which measures the offset amount for a discrete track type of magnetic recording medium including a discrete area that has a plurality of magnetic tracks where data can be recorded and that has a non-magnetic track where the data can not be recorded located between the plurality of adjacent magnetic tracks; and an offset amount measurement area formed only by magnetic material where data can be recorded, the offset amount measurement area being separated from the discrete area, the method for measuring the offset amount comprising:

first detecting coming of a sector start signal, and upon that first detecting positioning the reproducing head at a center position of a servo area;

second detecting an end of the servo area, and upon that second detecting moving the reproducing head in a radius direction;

reproducing the measurement pattern recorded in the offset amount measurement area;

repeating the first detecting, second detecting, and reproducing for a predetermined number of sectors;

storing an offset amount from the repeating and determining whether a current offset amount is a maximum compared to the stored offset amount; and when the determining determines that that current offset amount is the maximum, storing the determined current offset amount as an optimum offset amount.

3. A method for measuring the offset amount, which measures the offset amount for a discrete track type of magnetic recording medium including a discrete area that has a plurality of magnetic tracks where data can be recorded and that has a non-magnetic track where the data can not be recorded located between the plurality of adjacent magnetic tracks; and an offset amount measurement area formed only by magnetic material where data can be recorded, the offset amount measurement area being separated from the discrete area, the method for measuring the offset amount comprising:

first detecting coming of a sector start signal, and upon that first detecting positioning the reproducing head at a center position of a servo area;

second detecting an end of the servo area, and upon that second detecting moving the reproducing head in a radius direction;

reproducing the measurement pattern recorded in the offset amount measurement area;

repeating the first detecting, second detecting, and reproducing for a predetermined number of sectors;

storing an offset amount from the repeating and determining whether a current offset amount is a maximum compared to the stored offset amount;

when the determining determines that that current offset amount is the maximum, storing the determined current offset amount is an optimum offset amount; and calculating the offset amount for tracks for which the offset amount has not been measured by utilizing an interpolation with an approximate expression.

4. A magnetic recording medium that a composite magnetic head having a first head and a second head can record data on and reproduce data from, comprising:

a discrete area that has a plurality of magnetic tracks where data can be recorded and that has a non-magnetic track where the data can not be recorded located between the plurality of adjacent magnetic tracks; and an offset amount measurement area formed only by magnetic material where measurement data for measuring an offset amount indicating a relative distance from a center position of the magnetic track to the first head in a direction crossing the magnetic track when the second head is on the center position of the magnetic track can be recorded, the offset amount measurement area being separated from the discrete area, wherein the offset amount measurement area is provided in a track near a center of the magnetic recording medium.

* * * * *